(12) United States Patent
Cohen et al.

(10) Patent No.: US 6,570,534 B2
(45) Date of Patent: May 27, 2003

(54) LOW COST SYSTEM AND METHOD FOR MAKING DUAL BAND GPS MEASUREMENTS

(75) Inventors: Clark Cohen, Washington, DC (US); David Lawrence, Mountain View, CA (US); Stewart Cobb, Palo Alto, CA (US); Paul Montgomery, Menlo Park, CA (US); Miro Samek, Palo Alto, CA (US); Kurt Zimmerman, Mountain View, CA (US); Michael O'Connor, Redwood City, CA (US); Walter Melton, Columbia, MO (US); Gregory Gutt, Lexington Park, MD (US)

(73) Assignee: IntegriNautics Corp., Menlo Park, CA (US)

( * ) Notice: Subject to any disclaimer, the term of this patent is extended or adjusted under 35 U.S.C. 154(b) by 0 days.

(21) Appl. No.: 10/062,555

(22) Filed: Feb. 5, 2002

(65) Prior Publication Data

US 2002/0161522 A1 Oct. 31, 2002

Related U.S. Application Data

(60) Provisional application No. 60/266,811, filed on Feb. 5, 2001, and provisional application No. 60/295,935, filed on Jun. 4, 2001.

(51) Int. Cl.[7] .................................................. G01S 5/14
(52) U.S. Cl. .................................................. 342/357.12
(58) Field of Search ..................... 342/357.12; 701/213; 375/326, 339

(56) References Cited

U.S. PATENT DOCUMENTS 5,724,046 A  3/1998 Martin et al. .......... 342/357.12

(List continued on next page.)

FOREIGN PATENT DOCUMENTS

EP           0430364 A2    6/1991

(List continued on next page.)

OTHER PUBLICATIONS

Brown, Alison et al., "Digital L–Band Receiver Architecture with Direct RF Sampling", IEEE Position, Location, and Navigation Symposium, Apr. 1994, pp. 209–216.

(List continued on next page.)

Primary Examiner—Gregory C. Issing
(74) Attorney, Agent, or Firm—Bacon & Thomas, PLLC

(57) ABSTRACT

A low-cost, solid-state position sensor system suitable for making precise code and carrier phase measurements in the L1 and L2 bands of GPS uses an ordinary, low-cost OEM card single-frequency carrier phase tracking C/A code receiver and includes low-cost hardware for sensing the L1 and L2 components of GPS carrier phase. Such measurements are suitable for general use in a variety of fields, including surveying. They are also of sufficient quality to be used in controlling heavy machinery, such as aircraft, farm tractors, and construction and mining equipment. A C/A code continuous tracking GPS receiver is used to produce GPS positioning fixes and real-time L1 carrier phase measurements. This C/A code receiver generates timing and reference information for a digital sampling component. This sampling component processes the L1 and L2 signals from the GPS signals in view. A digital signal processing component coupled to this sampling component processes the raw samples in synchronous, batch form including a step to precisely unwrap the P(Y) carrier phase to baseband. The receiver outputs synchronous, carrier phase measurements associated with each ranging source and signal observable. The synchronous raw carrier phase measurements from the continuous tracking C/A code receiver and the digital sampling component may be used to resolve the cycle ambiguities to each ranging source with respect to a reference station at a known location. Within a short interval typically tens of seconds from initial turn on, continuous, synchronous raw measurements are provided by the GPS receiver and processed into precise position fixes.

18 Claims, 17 Drawing Sheets

U.S. PATENT DOCUMENTS

| | | | |
|---|---|---|---|
| 5,903,654 A | 5/1999 | Milton et al. | 380/49 |
| 5,949,374 A | 9/1999 | Nelson, Jr. | 342/357.15 |
| 6,125,135 A * | 9/2000 | Woo et al. | 375/130 |
| 6,278,403 B1 * | 8/2001 | Peng et al. | 342/357.12 |
| 6,304,216 B1 * | 10/2001 | Gronemeyer | 342/378 |

FOREIGN PATENT DOCUMENTS

| | | | |
|---|---|---|---|
| GB | 2166324 A * | 4/1986 | |
| WO | WO9305407 | 3/1993 | |

OTHER PUBLICATIONS

Zhuang, Weihua, "Performance Analysis of GPS Carrier Phase Observable", IEEE Trans. on Aerospace and Electronic Systems, vol. 32, No. 2, Apr. 1996, pp. 754–767.

Wu, Sien–Chong et al., "An Optimal GPS Data Processing Technique for Precise Positioning", IEEE Trans. on Geoscience and Remote Sensing, vol. 31, No. 1, Jan. 1993, pp. 146–152.

* cited by examiner

Direct Sampling Version of Hardware Architecture

Hardware Architecture for Preferred Embodiment

Downconverting R.F. Section

Sampled Dual-Frequency GPS Signals

Signal Processing Architecture

Preferred Signal Processing Architecture

Architecture for Custom DSP Preferred Embodiment

Fast Lookup Table Implementation

Parallel Lookup Table Configuration

Signal Processing Flowchart
(single satellite)

Main Flowchart
(outer loop)

Custom DSP Signal Processing Flowchart
(single satellite)

L2 C/A Code Signal Processing Architecture

Autofarm System Using GPS

Physical Configuration of Low-Cost, Self-Contained Reference Station for Automatic Control of Heavy Machinery Distributed Layout of Reference Stations for Serving Regional Areas

LOW COST SYSTEM AND METHOD FOR MAKING DUAL BAND GPS MEASUREMENTS

This application claims the benefit of U.S. Provisional Appl. Ser. Nos. 60/266,811, filed Feb. 5, 2001, and 60/295,935, filed Jun. 4, 2001.

BACKGROUND OF THE INVENTION

1. Field of the Invention

This invention relates to a GPS receiver, and in particular to a solid state GPS receiver that provides continuous carrier phase tracking. The GPS receiver of the invention maybe used, by way of example, to provide real time control or guidance of heavy machinery, including farm equipment.

2. Description of Related Art

This section begins with a background discussion of the current Global Positioning System (GPS), which is followed by a discussion of the requirements of, and problems associated with, application of GPS to automatic control of heavy machinery and in particular farm equipment, and finally a discussion of specific previously-proposed solutions to some of the problems addressed by the present invention. Those skilled in the art will appreciate that although the present invention addresses a number of problems related to specific applications, the solutions presented may be applicable to a wide variety of different GPS applications, in contexts not specifically discussed herein. The discussion of related art is therefore not intended to be limiting, nor should the related art discussed herein be considered the only prior art having relevance to the present invention.

The Global Positioning System (GPS)

GPS is a satellite constellation originally developed by the U.S. military for real-time 3 dimensional position fixing worldwide. GPS nominally employs 24 satellites in circular 26,000 km orbits. Each satellite carries an atomic frequency standard tied to GPS time as maintained by the U.S. Naval Observatory. The radio signal propagates from the satellite to the user at the speed of light. The ability to determine range to the satellite is therefore governed by one's ability to measure time.

The normal operation of GPS is to broadcast a timing signal using a known biphase pseudo random noise (PRN) code so that a receiver can lock up to this pre-defined sequence. If a user had a perfect clock, ranging to 3 separate sources (one for each dimension of latitude, longitude, and altitude) would be sufficient to determine one's position. To allow for low-cost receiver sets that utilize a simple quartz oscillator time base, the design of GPS includes an additional $4^{th}$ ranging source. Therefore, every position fix includes a solution for a users position and clock bias with respect to GPS time.

GPS broadcasts on two frequencies, L1 and L2. We can define a basic frequency reference of GPS to be $f_0$ (1.023 MHz). L1 is 1540 $f_0$ (1,574.42 MHz), and L2 is 1,200 $f_0$ (1,227.60 MHz). L1 provides a known C/A code that is provided for civil use worldwide at all times. This is a PRN code that is modulated at $f_0$. There is also a P(Y) code provided on both L1 and L2 that is modulated at 10 $f_0$. The default operational mode is that a known P code is broadcast. The U.S. Military may decide from time to time to switch to an alternate unknown (encrypted) Y code. This mode is called "Anti-Spoofing", or AS. Because this code is not known a priori to an enemy in a time of military conflict, an enemy cannot generate a false signal that could be used to mislead an allied receiver about its own true position.

GPS is now used in a wide variety of applications, including transportation, recreation, scientific research, and industry. The specific applications contemplated herein are general and could pertain to a broad range of applications, including surveying, GIS, natural resources, and mapping. Furthermore, GPS is now starting to be used as a guidance and control sensor in aviation, agriculture, construction, and mining.

Precision Control Applications

Precision automatic control of heavy machinery places stringent requirements on the navigation sensors that are used for guidance. Examples of such machinery and applications are aircraft automatic landing, automatic steering of farm tractors, and autonomous operations of mining and construction equipment, including haul trucks. Sometimes the heavy equipment made from steel and hydraulics, such as tractors, haul trucks, dozers, drills, shovels, road graders, etc. are known as "heavy iron".

Farm Tractors

Automatic guidance of farm tractors is starting to provide major new efficiencies to farmers. Some of the first gains are being realized in row crops, such cotton and vegetables. In row crops, it is very important to create straight furrows for planting and subsequent operations. If rows are too close, the cultivating process will shred the farmer's crop. If the rows are too widely separated, a farmer loses valuable surface area that could be used for planting.

Prior to automatic guidance, a farmer could only carry out operations in good visibility. Fog, dust, or darkness meant an automatic pause or end to operations. Now, with a GPS-based tractor autosteering system, a farmer can operate 22 hours per day—something he could never do before. An example of such equipment is the AF5001 manufactured by IntegriNautics in Menlo Park, Calif. Such a unit determines the position of a tractor to a centimeter of accuracy, then uses that information to directly control the steering of the tractor to follow straight rows. The lateral accuracy is one inch.

A human operator is still used. After a 12 hour shift, chronic fatigue is effectively eliminated because the operator now spends his time managing the overall quality functioning of the tractor process-especially the appropriate functioning of the implement itself.

Other gains are being recognized for major commodities, such as corn, wheat, and soybeans. By eliminating the row overlap that commonly occurs, farmers will see 10% reductions in fuel, fertilizer, time, and pesticide use.

Cycle Ambiguity Resolution

For precision positioning using the GPS carrier, centimeter-level accuracy is possible only after the integer cycle ambiguities are resolved between the baseline separating each pair of antennas projected into the line of sight to each satellite.

Some methods of cycle ambiguity resolution include Cohen et al. (U.S. Pat. No. 5,572,218), Zimmerman et al. (pending application filed by IntegriNautics), and Rabinowitz et al. (pending application filed by Stanford). Other methods employ "wide-laning" using dual frequency GPS carrier phase measurements. Because the two GPS frequencies when differenced have an effective wavelength that is much longer than that of either band by itself, it is possible to use that information to systematically search for the correct set of cycle ambiguities that form the smallest residual solution error. Various algorithms have been developed that sequentially throw out the "image" solutions. The reference (Instantaneous Ambiguity Resolution, by Ron Hatch, Paper Presented Sep. 11, 1990 at Banff, Canada at KIS Symposium 1990) describes one such technique. "Wide-laning" is a generic approach known in the art.

Precision Requirements

It is envisioned that this invention will be broadly applicable. However, it is also strongly desired that the invention be useable as a guidance sensor of high quality to control heavy machinery to stringent standards of precision, safety, and reliability. Suitability for machine control implies the potential to be integrated into a feedback control loop system controlling a vehicle or machine to 1 inch lateral accuracy that weighs typically in excess of 20,000 lb. In our invention GPS becomes capable of providing the necessary levels of performance, but requires specific augmentation.

The general requirements for precision control of heavy machinery are as follows:

Accuracy (system deviation from truth): Must be 1 cm (one sigma) or better.

Integrity (system ability to provide timely warnings of hazardous readouts): Probability of hazardously misleading information must be better than one failure in a billion landing approaches for civil aviation. Goal for autonomous applications in heavy iron is better than one failure in a million operational per equivalent exposure time of 150 seconds.

Continuity (probability of operating continuously for entire landing approach—150 second exposure time—given proper system function at start of operation): Established at one failure in 10 million approaches. The indirect requirement on the system is that it must have robust, synchronous output (i.e., no skipped outputs during exposure time at an output rate of 10 Hz). Goal for autonomous operations is one failure per 100,000.

Availability (fraction of time the system is able to provide service): System must be available on demand at least 99.99% of the time.

Acquisition Time (time from cold start to normal operation): A few minutes, typically less than two minutes, is all that is tolerable.

Communications: Should be simple, non-synchronous (i.e., relatively insensitive to latency), low bandwidth, be flexible so as to be compliant with any spectrum regulations, and be resistant to r.f. interference.

Environmental: Should be simple with minimum component count. Simplicity offers more demanding environmental performance and better overall reliability.

Power: Base stations must be low power (often use self-contained power source).

Cost: Must be low cost.

Limitations of Previously Proposed Systems and Methods

Westerfield (U.S. Pat. No. 4,622,557) teaches how a GPS front-end coupled to a down converter, sampler, modulator, and transmitter (a "transdigitizer") can be used to transmit a real-time r.f. replica of an incoming GPS signal as received from a mobile vehicle (such as a sonobuoy). The ground station then processes the real-time information into position fixes.

An analog version (called a GPS "translator") is described in (Well, L. L., "Real-Time Missile Tracking with GPS", Navigation, vol. II: 105–111 (1984)). Here the incoming GPS signal from a missile is downconverted and rebroadcast on a different band for ground processing.

Cohen (U.S. Pat. No. 5,583,513) describes a pseudolite-based reference station that locks onto the GPS satellites signals, modulates alternate, differentiable codes onto the GPS signal, then coherently rebroadcasts the incoming remodulated carrier signal. The mobile unit can pick up this signal and use it as a differential reference station for position fixing.

However, each of these techniques is limited due to the implicit line-of-sight requirement in the link between the mobile unit and the ground station. In fact, none of these techniques is suitable for automatic control of heavy equipment because each is restricted to cases where there is stable (multipath-free) link or line-of-sight between the ground station and the vehicle. Furthermore, they require significant r.f. bandwidth to implement (between 2 and 10 MHz) which is not readily available to civilian users. The chosen band can also be susceptible to interference.

Other variations of prior art include Johnson (U.S. Pat. No. 5,420,592) and Brown (U.S. Pat. No. 5,379,224) who teach systems (such as for radiosondes) that take digital samples of the raw GPS signal, place them into a buffer, and telemeter them to a ground station for post processing into position fixes. The ground station can optionally use a conventional C/A code GPS receiver for differential operation. Variations on this theme running in post processing are given in the following two papers, (i) A. Brown, M. May, B. Tanju, "Benefits of Software GPS Receivers for Enhanced Signal Processing", *GPS Solutions*, 4(1) Summer, 2000, pages 56–66), in which the authors use the signal processing power of a computer to derive more performance in the presence of jamming or low signal to noise ratio; and (ii) A. Brown, A. Matini, D. Caffery, High Dynamic, Dual Frequency Tracking with a Low Bandwidth Digital Translator, ION GPS-96, September, 1996, in which the raw GPS spectrum is truncated to 2 MHz prior to being broadcast to the ground. The last technique among the solutions of this class is not considered viable for civil applications because it requires classified knowledge of the GPS encryption algorithms to implement and use.

Also, Krasner has several patents (including U.S. Pat. Nos. 5,663,734; 6,133,874; 6,064,336; 5,781,156; 5,945,944; 5,831,574; 6,016,119) that concern positioning in conjunction with cellular telephone operation. He teaches how a central GPS server/reference station sends out specific aiding information to a user receiver. The aiding information includes an approximate satellite doppler estimate for the user, satellite ephemeris information, reference station reference differential corrections, and an r.f. pilot tone over the communication link for calibrating the user crystal oscillator. The user takes samples of incoming GPS C/A code signals and stores them into a buffer. Using the aiding information supplied by the reference station, the user receiver performs a "fast convolution" between a pre-stored representation of the C/A code and the stored samples to derive an estimate of the GPS pseudorange for each satellite. These pseudoranges are combined to calculate a position fix.

However, these solutions are not useful for performing precision, centimeter-level measurements, let alone applying those measurements to automatic control. None of these inventions are able to offer the use of carrier phase for performing precision positioning because they do not track the carrier continuously (if at all), let alone track it in real time. Brown does address solving for the carrier by a technique of iteratively reprocessing the same data until convergence, but only in the sense of a single burst of data and in post processing. It is clear that an iterative, post processing receiver will eventually converge on the correct solution and could therefore be operated quasi real time given enough tolerance on latency, signal dilution, and/or processing power. However, quasi real time control is only a partial solution. What is needed for a generally useful receiver and for real-time control is a robust solution obtained as quickly as possible using minimal processing resources. But perhaps what is most at issue is that none of these approaches can sustain continuous carrier phase measurements from one data burst to the next. This is imperative for preventing cycle slips and especially for real-time control of heavy machinery.

These systems are architected in ways that do not favor real-time machine control. Two of them (Johnson/Brown) calculate the position fix at the reference site. But the solution is needed in real-time at the user site for control purposes. The additional latency that would be introduced by broadcasting distinct solutions for group of many users is undesirable. The other inventions that do allow the user to calculate his own position (Krasner) are oriented around a having a central server that transmits aiding information, including a pilot tone on the communication link frequency. This additional requirement for an r.f. pilot tone may be acceptable for cellular phone applications, but it is costly and even unworkable for machine control because multipath will constantly corrupt the phase of that signal as it skims the earth's surface. None of these systems are useable for robust, synchronous, carrier-phase positioning required for automatic control of heavy machinery.

One feature of the invention described herein is the combination of a conventional GPS receiver with one that samples and buffers GPS signals for subsequent processing. Krasner (U.S. Pat. Nos. 5,884,214 and 6,104,340) contemplates combining a first conventional GPS receiver with a second sampled and buffered receiver to create a backup in case of weak GPS signals. In his invention he is concerned with losing the first GPS signal if it becomes too weak. Normally, the first conventional receiver runs. If the signal is lost, the second receiver serves as a backup. Because of its design, the second receiver is able to integrate weak signals longer and therefore has a better chance of recovering a good measurement during blockage.

However, these two Krasner patents again do not forsee broader application for general carrier phase tracking and especially machine control required herein-both in their intended application (dealing with signal blockage) and their design (which yields discontinuous output that is unsuitable for tracking carrier phase without cycle slips). Typically, the carrier is corrupted by multipath during blockage conditions and must therefore be flagged as useable—regardless of its processing means, traditional or snapshot. Even in the presence of a solid, unblocked signal, the prior art does not provide for any of the qualities of robust, synchronous, centimeter-level, carrier phase output that are mandatory to conduct machine control.

As mentioned previously, a key requirement for kinematic operation is resolving integer cycle ambiguities. Some methods involving pseudolites and LEO satellites were mentioned previously and will work well, both in general and for machine control. Dual-frequency GPS measurements of carrier phase are another way to resolve integers, as described previously. For machine control, an ideal solution is one which employs many or all of the above techniques simultaneously to maximize performance.

Many existing dual-frequency receivers employ the unknown Y-code signal of GPS and rely on at least some subset of the following assumptions about the GPS signal.

The Y code is the product of the P code and an (unknown) W code
The W code has a bandwidth of approximately 500 kHz
The Y code is modulated identically on L1 and L2

It is possible to square the L2 signal to recover the carrier. Counselman (U.S. Pat. No. 4,667,203) describes a receiver which generates the second harmonic of the carrier. Other receivers that recover the carrier phase of L2 are described by MacDoran (U.S. Pat. No. 4,463,357), Keegan (U.S. Pat. No. 4,972,431), and Meehan et al. (U.S. Pat. No. 6,061,390).

While these receivers all perform as expected, one disadvantage they share with respect to machine control applications is that they produce either a half cycle ambiguity in the L2 phase or a somewhat larger (i.e., by more than 10 dB) noise than other receivers.

Lennen (U.S. Pat. No. 5,825,887) describes a system that uses High Gain Antennas (HGAs) to point at each GPS satellite to try to estimate the W code in real time. This estimate is then used by mobile receivers to strip off the unknown Y code. However, this approach requires expensive and complex HGAs to be employed. Farmers, for example, and most other users need a simple and inexpensive approach.

Another class of receiver provides an advantage of both lower noise and full cycle reconstruction at the output. These receivers make more effective use of the GPS signal by exploiting all of the assumptions listed earlier—most notably that the encrypted Y code is the product of the P code and an unknown W code. Some examples of these receivers are Lorenz et al. (U.S. Pat. No. 5,293,170), Litton et al. (U.S. Pat. No. 5,576,715), Woo et al. ("Optimum Semicodeless Carrier-Phase Tracking of L2", Navigation, Vol. 47, No. 2, p. 82), and Lennen (5,610,984).

However, none of the techniques used for deriving dual-frequency observables in these receivers is suitable for the periodic, sampled processing receiver that is the subject of this invention. Obtaining measurements of carrier phase has traditionally required continuous, uninterrupted lock. With a subject invention receiver that can undergo periodic extended gaps in signal processing as it operates, a new means of deriving carrier phase measurements is needed. Traditional tracking loops—with their attendant start-up transients, acquisition modes, and vulnerability to cycle slips due to discontinuous signal coverage—will not work. A new method of measuring dual-frequency observables that can withstand interruptions in processing without inducing cycle slips is needed to fulfill all the requirements outlined above.

Many different dual-frequency GPS sets are available on the market. There are at least five major manufacturers in the U.S. GPS industry who market such receivers, including some covered by the above listed patents. Each has some means for recovering the encrypted component of the GPS signal in case the military decides to invoke anti spoofing (AS).

A key advantage of dual-frequency receivers for resolving cycle ambiguities is that the process is rapid and reliable if the correct algorithms are used to process the raw measurements. Key disadvantages are that these receivers consume significant power, and they are expensive.

For example, when used as a reference base station on a farmer's field, several receivers may be needed at once to service an operating area. To minimize operational burden, a compact, inexpensive reference station needs to be able to be set up once by a farmer and run on a minimum of power, such as a battery that is kept charged by a solar cell.

The intrinsic expense of conventional, off-the-shelf dual-frequency receivers means that a farm tractor system component that is actually used less than 1% of the time accounts for almost 50% of the total system cost.

SUMMARY OF THE INVENTION

It is therefore an objective of the invention to provide a simple, low-cost, high-performance positioning sensor that can help farmers, precise machine control users, and users in other applications be more efficient.

According to an ideal architecture for the hardware of the invention, the sensor of the invention uses a common clock to drive a standard C/A code GPS chipset, which in turn generates a coherent 40 MHz sampling clock for the L1 and L2 channels. C/A code carrier phase measurements are then taken synchronously with bursts of raw L1 and L2 quadrature samples. To minimize hardware, these samples may, within the scope of the invention, be taken directly at L band, although the illustrated embodiment of the invention includes a downconverting front-end due to practical limitations on the sharpness of current anti-aliasing filters. In either case, two bits preferably encode the raw L1 and L2 samples, an Interface Block capturing the raw data, which, in varying forms of the invention, can buffer, preprocess, or directly pass the data to a computer or other form of digital signal processor (DSP).

The preferred digital signal processing components include an internal software signal generator that synthesizes both the P-code and carrier phase for both L1 and L2. Once the receiver has acquired and tracked the signal, each of these signal components may be fed forward from the C/A code measurements that are being tracked concurrently. The raw, complex samples are computationally mixed to baseband by simply multiplying the generated signal by the incoming. To speed this mixing process, a one-step lookup table may be employed. The mixed signal product is summed with a 2 ms period to wipe off the P-code and rotate the signal to baseband. The resulting L1 and L2 signals are mixed together to wipe off the residual W-code. The remaining signal is a baseband single-difference phase measurement for a given satellite that is essentially "frozen" in the I-Q plane. By integrating for 100 ms or longer, the noise is averaged down to obtain a useable signal.

The system and method given here allow provide for an exceptionally low-cost (<$500) dual-frequency receiver capable of centimeter-level performance in real time.

DETAILED DESCRIPTION OF THE PREFERRED EMBODIMENTS

Figure 1:
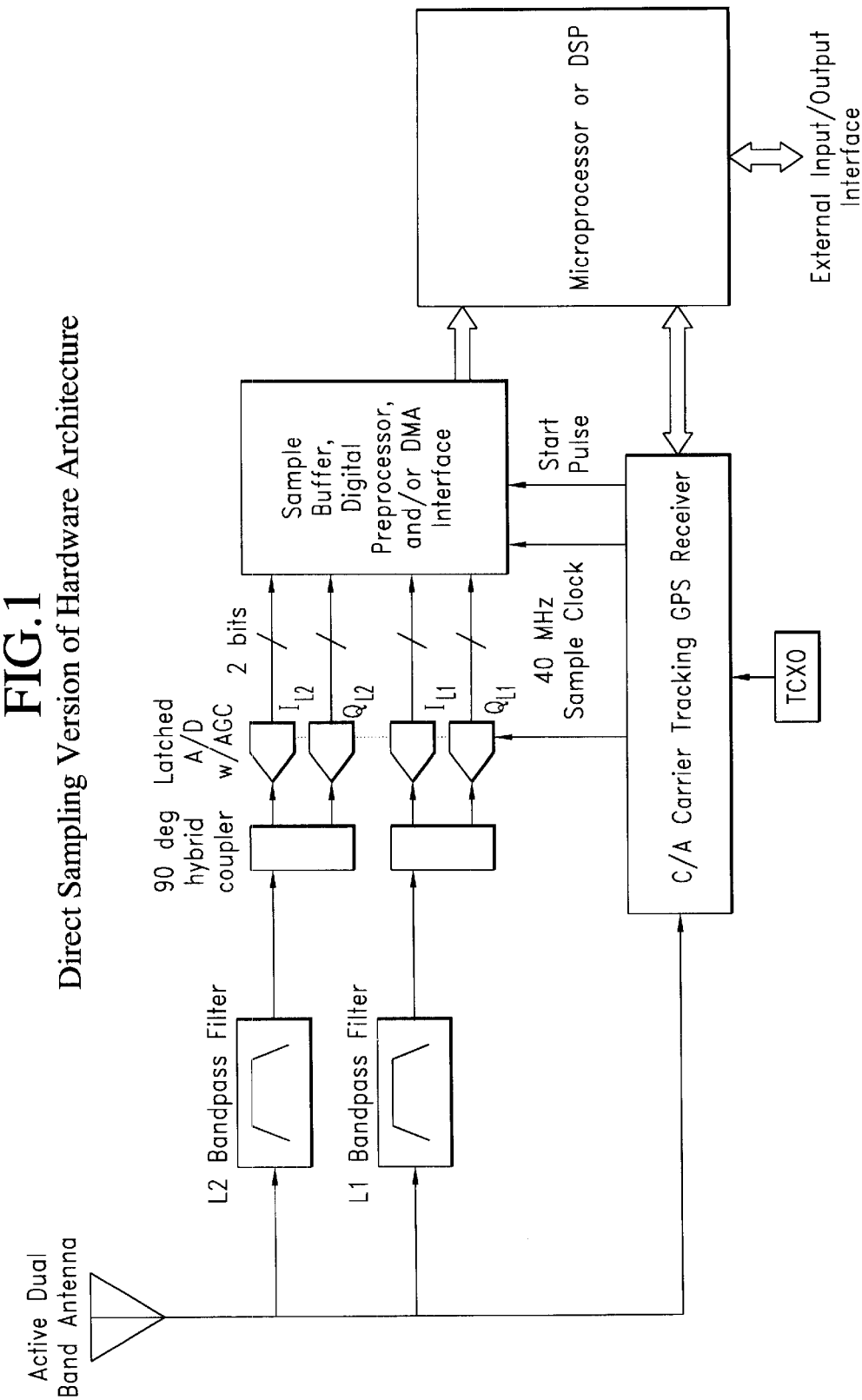
FIG. 1 is a schematic diagram of a direct sampling version of a GPS hardware architecture that utilizes the principles of the invention.
Figure 2:
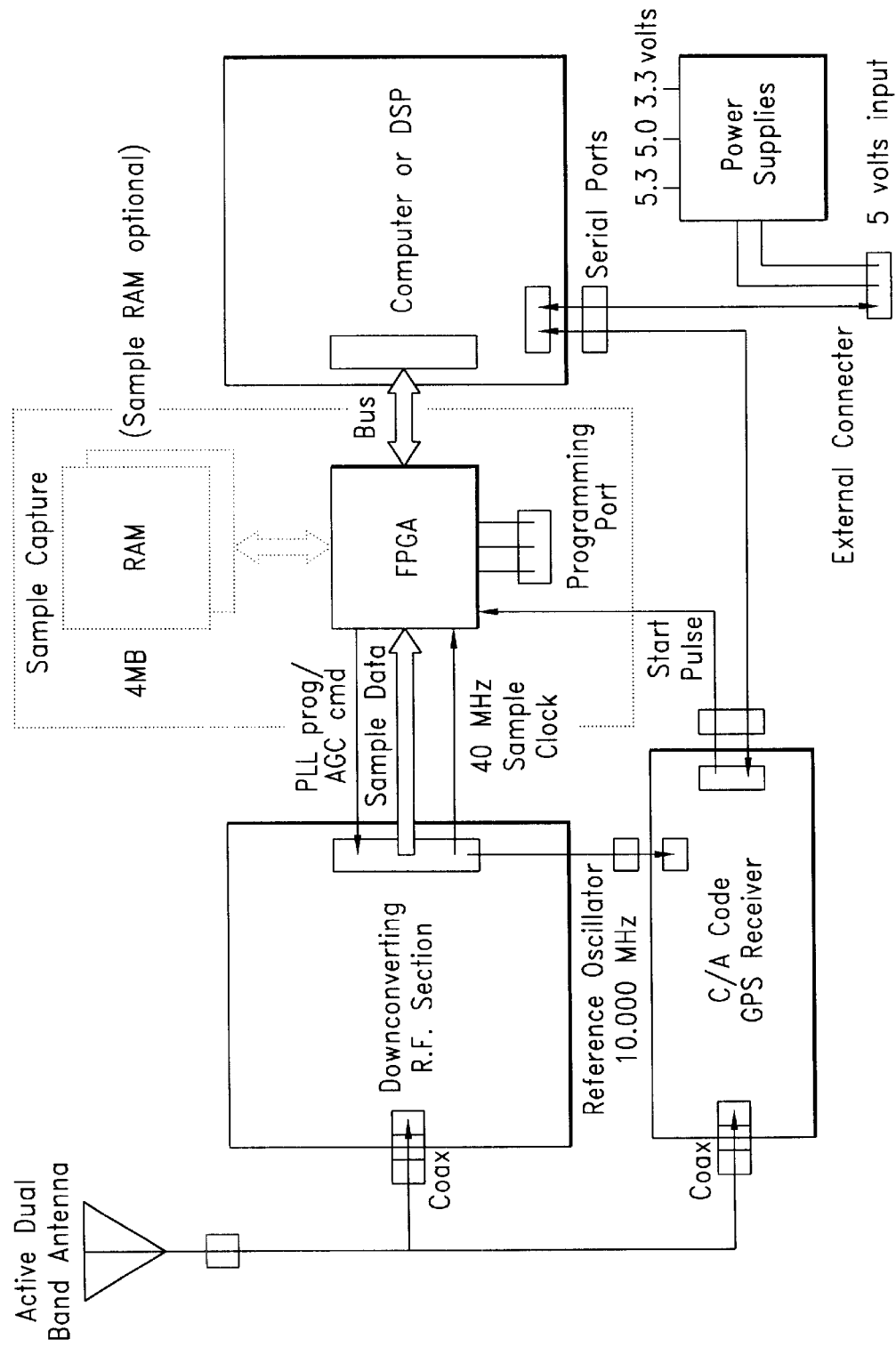
FIG. 2 is a schematic diagram of a hardware architecture that includes a downconverting R.F. section according to a first preferred embodiment of the invention.
Figure 3:
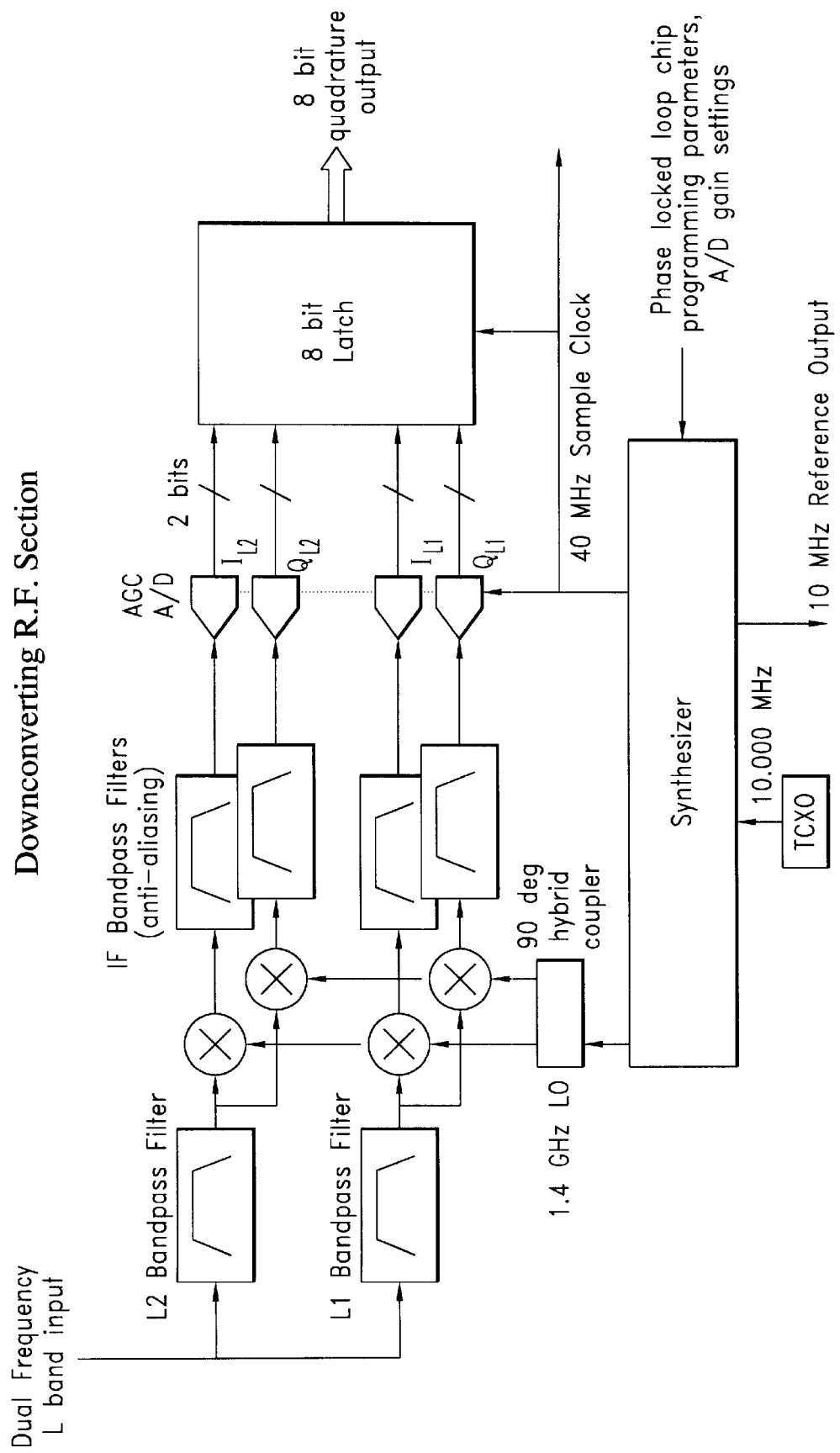
FIG. 3 is a schematic diagram of an implementation of the downconverting R.F. section that may be used in the hardware architecture illustrated in FIG. 2.
Figure 4:
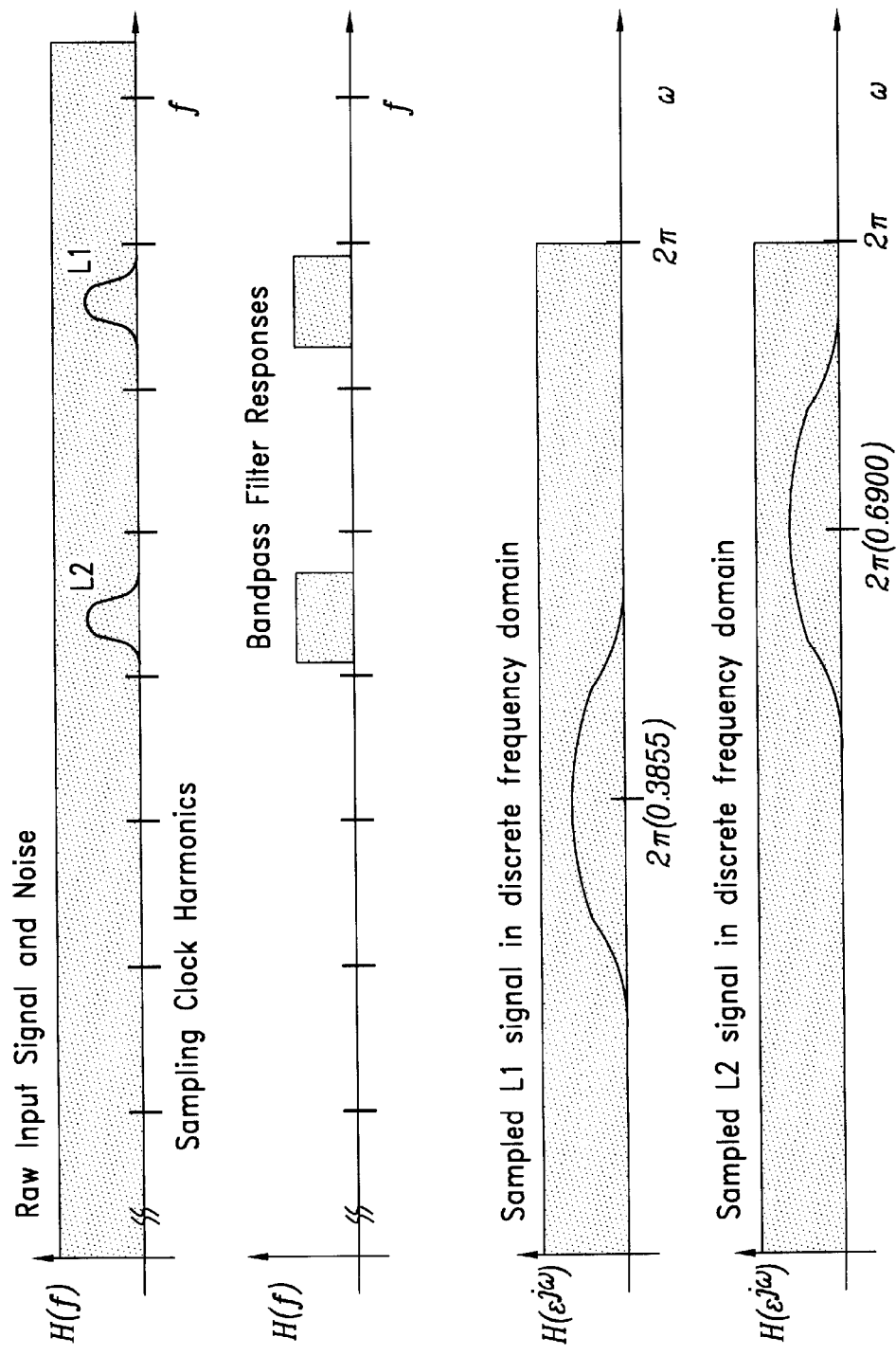
FIG. 4 is a timing diagram showing sampled dual frequency GPS signals.
Figure 5:
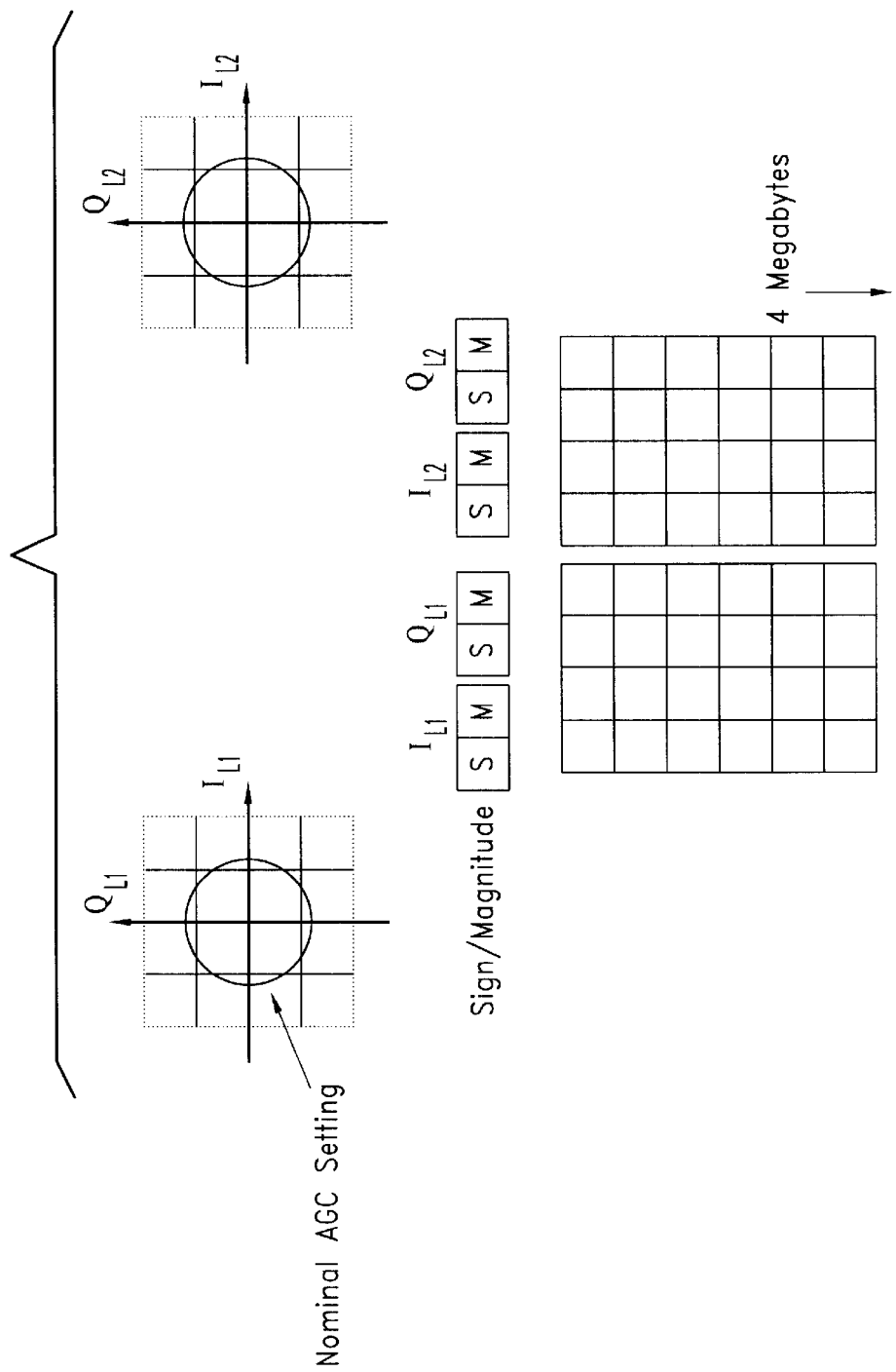
FIG. 5 is a schematic diagram illustrating a storage format for digital sampling that may be used in connection with the hardware architecture illustrated in FIG. 2.
Figure 6:
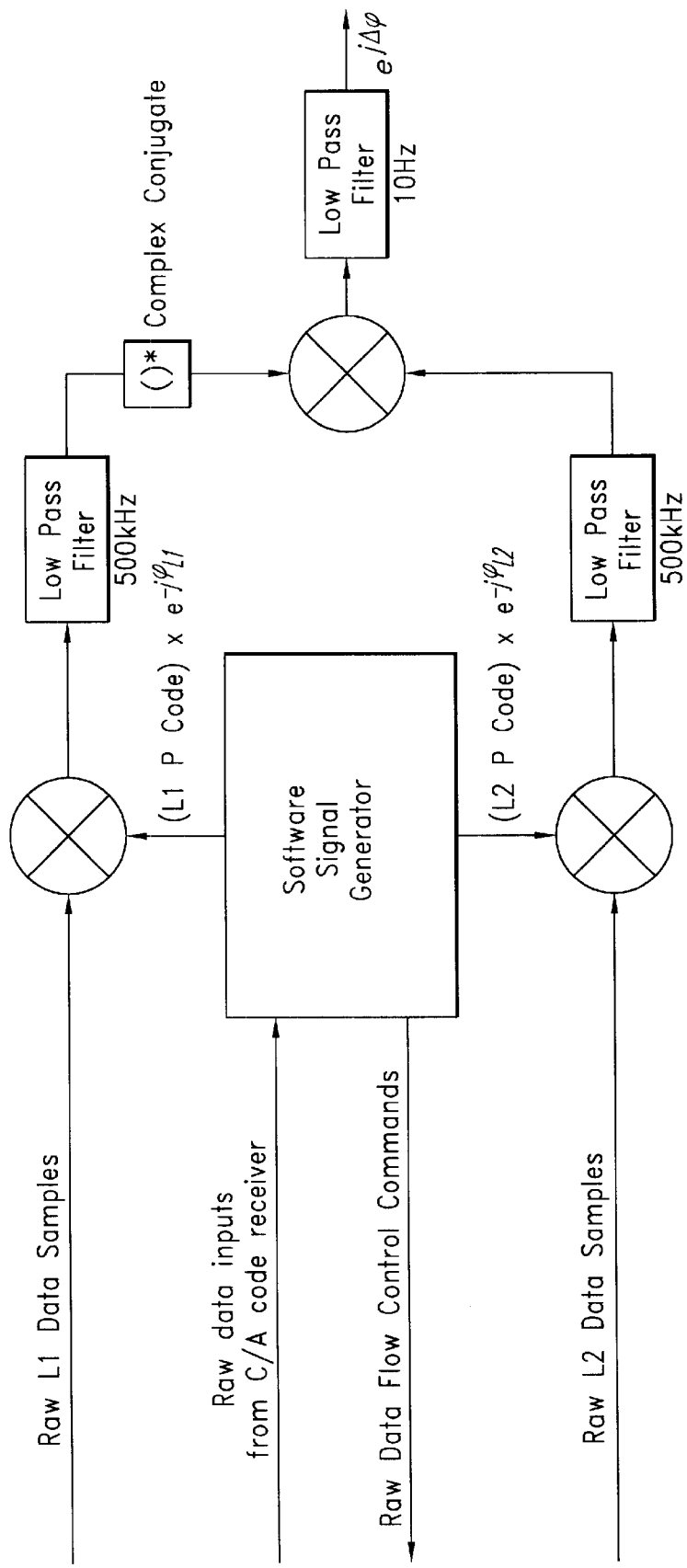
FIG. 6 is a schematic diagram of a signal processing architecture for use in connection with the hardware architecture illustrated in FIG. 2.
Figure 7:
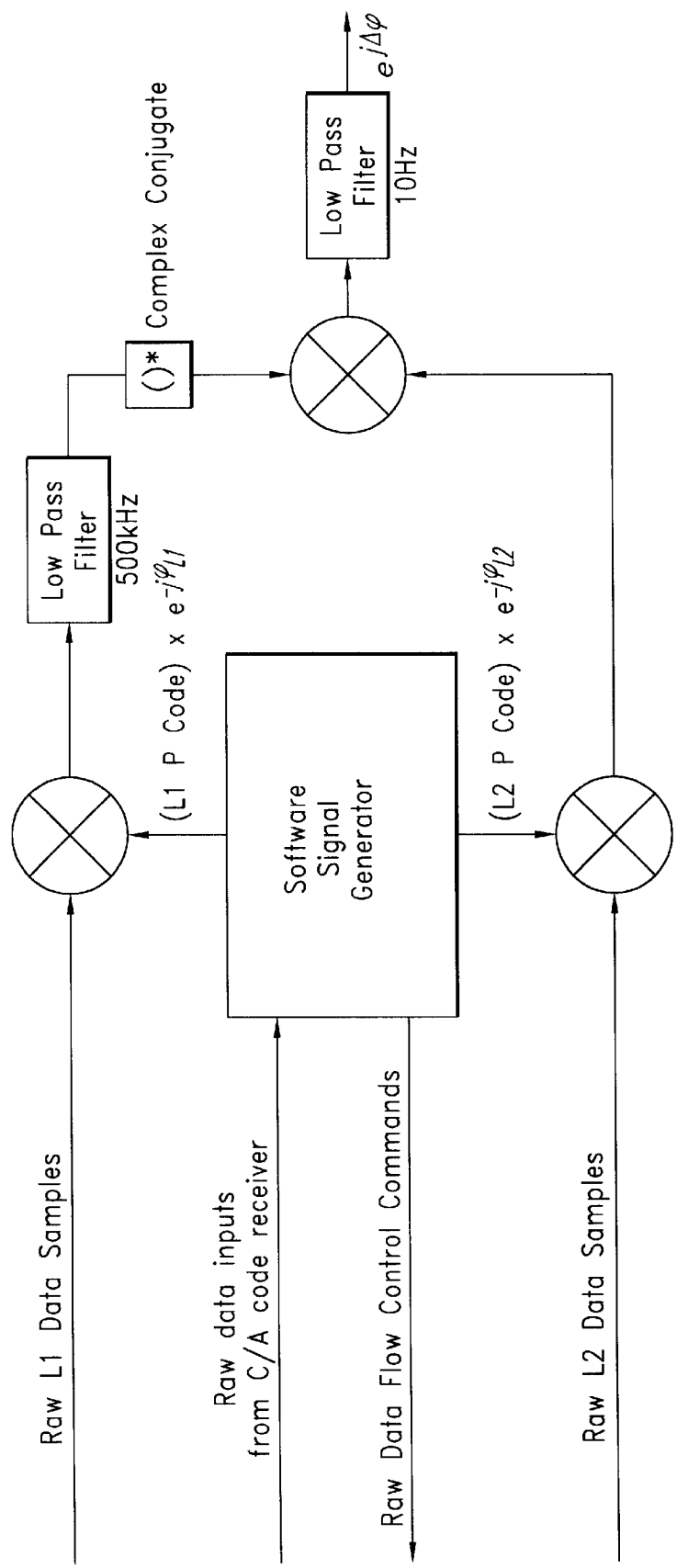
FIG. 7 is a schematic diagram of a preferred variation of the signal processing architecture of FIG. 6.
Figure 8:
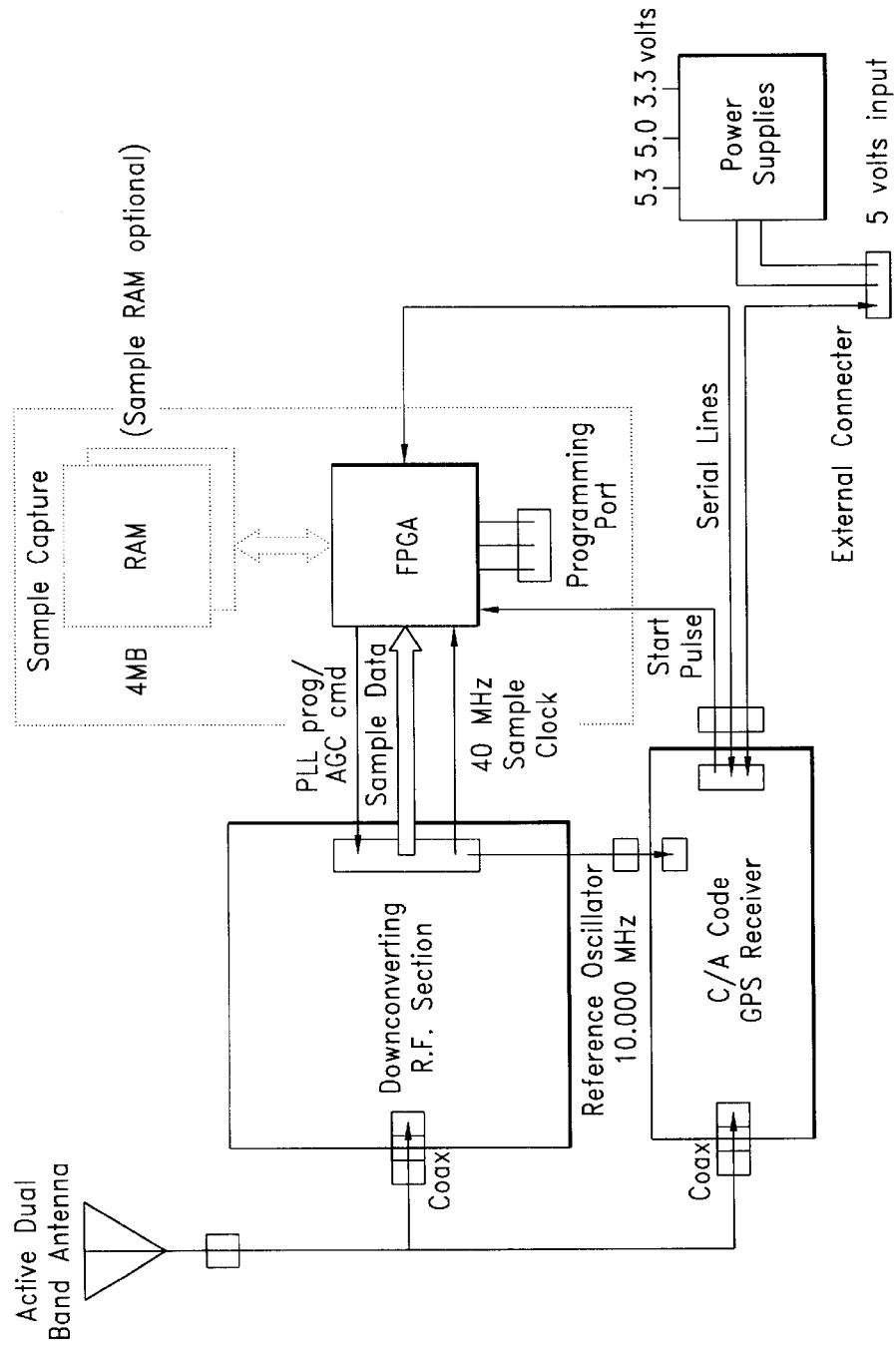
FIG. 8 is a schematic diagram of a preferred architecture for a custom digital signal processor.
Figure 9:
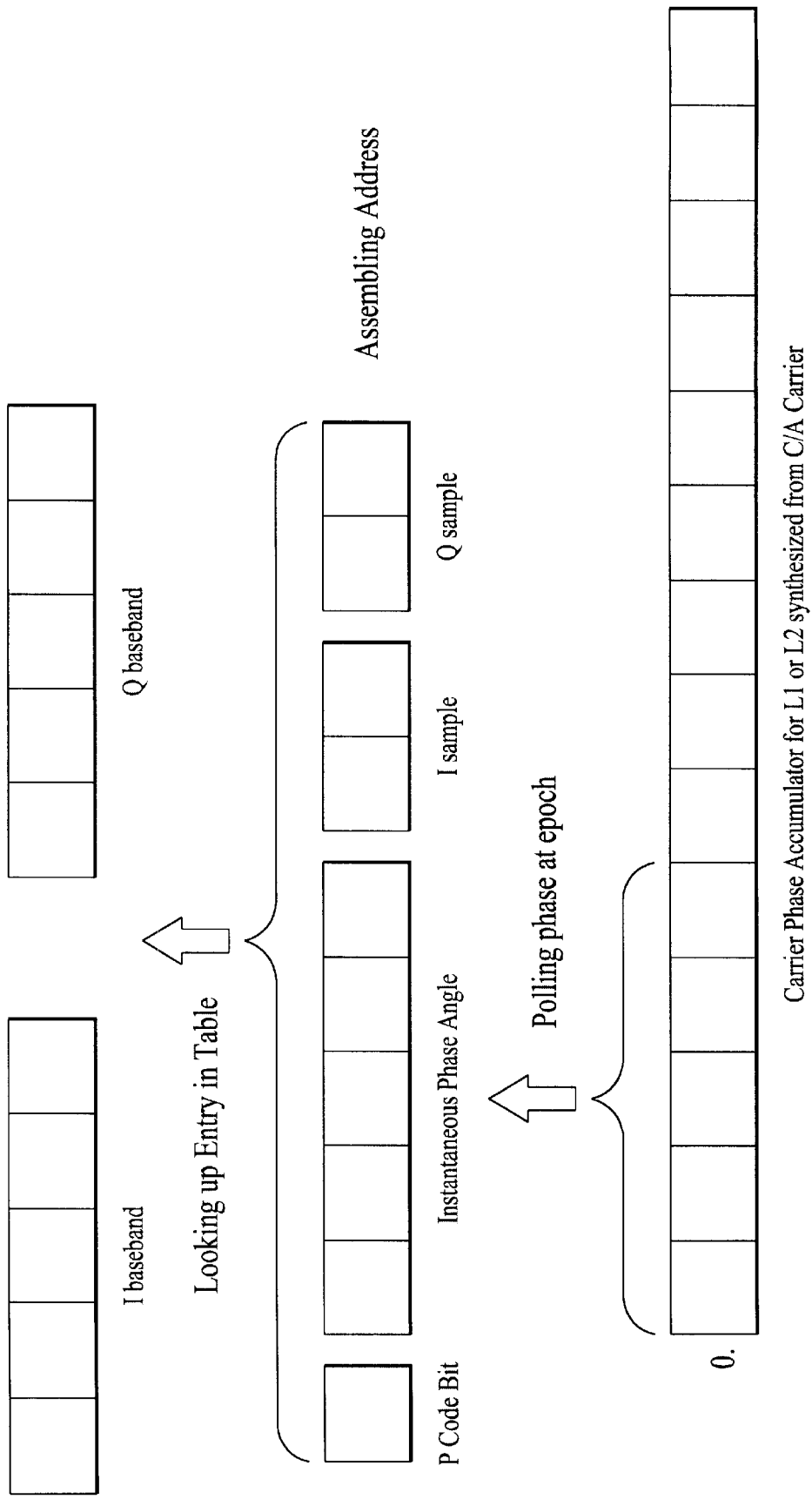
FIG. 9 is a schematic diagram of a preferred fast look-up table implementation.
Figure 10:
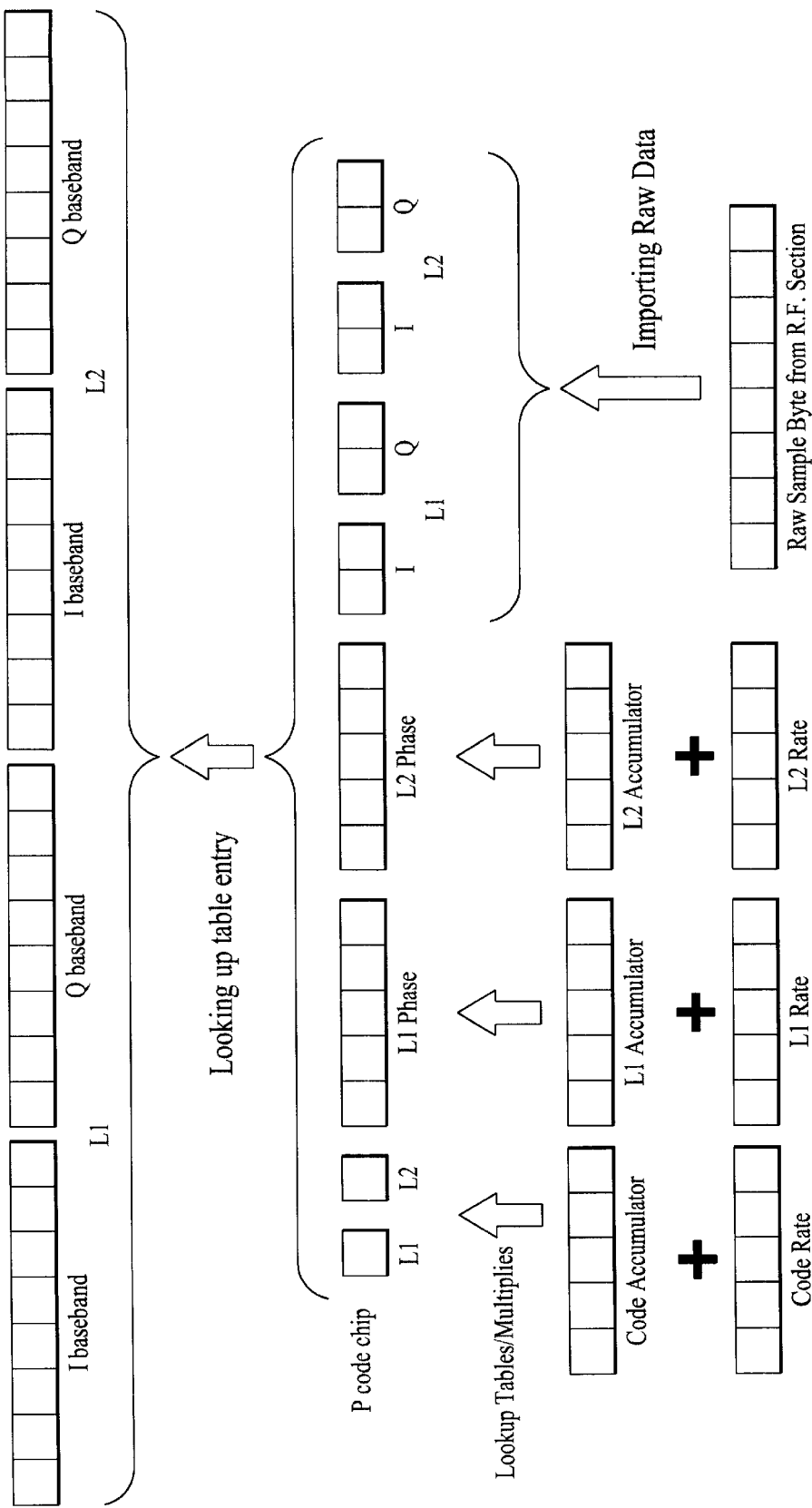
FIG. 10 is a schematic diagram of a preferred parallel look-up table implementation.
Figure 11:
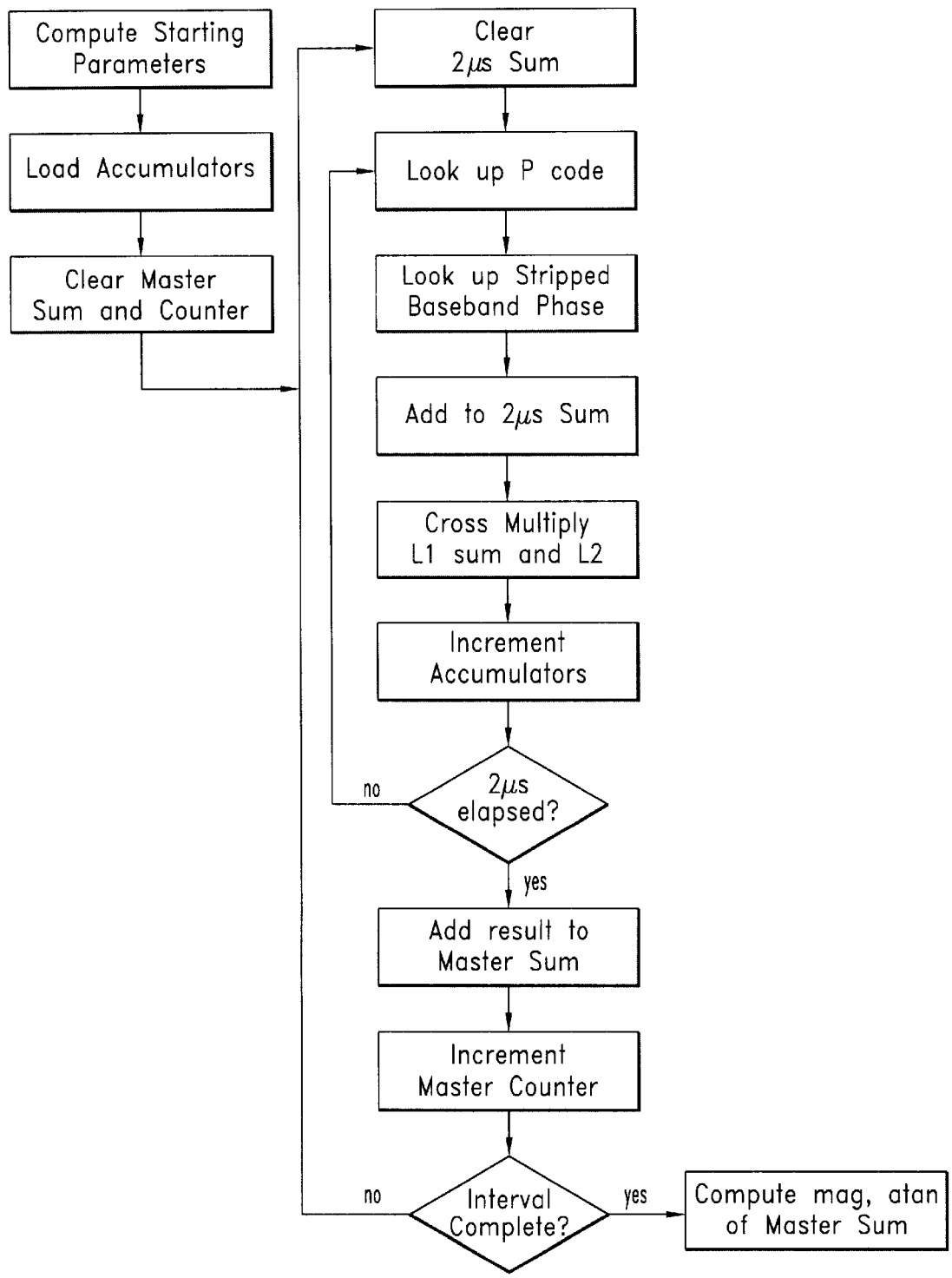
FIG. 11 is a flowchart of a preferred single-satellite signal processing method.
Figure 12:
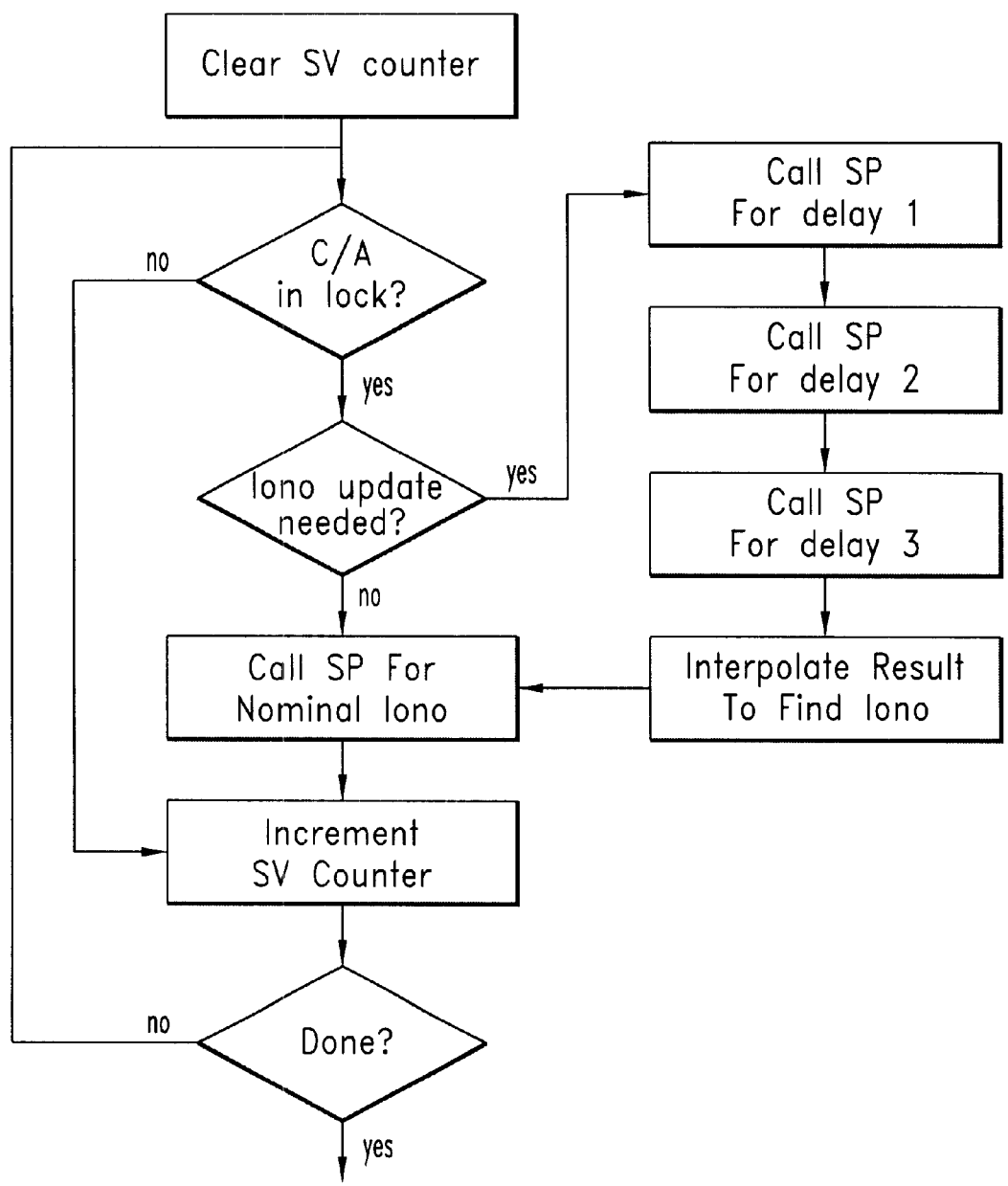
FIG. 12 is a flowchart showing an outer loop of the preferred method.
Figure 13:
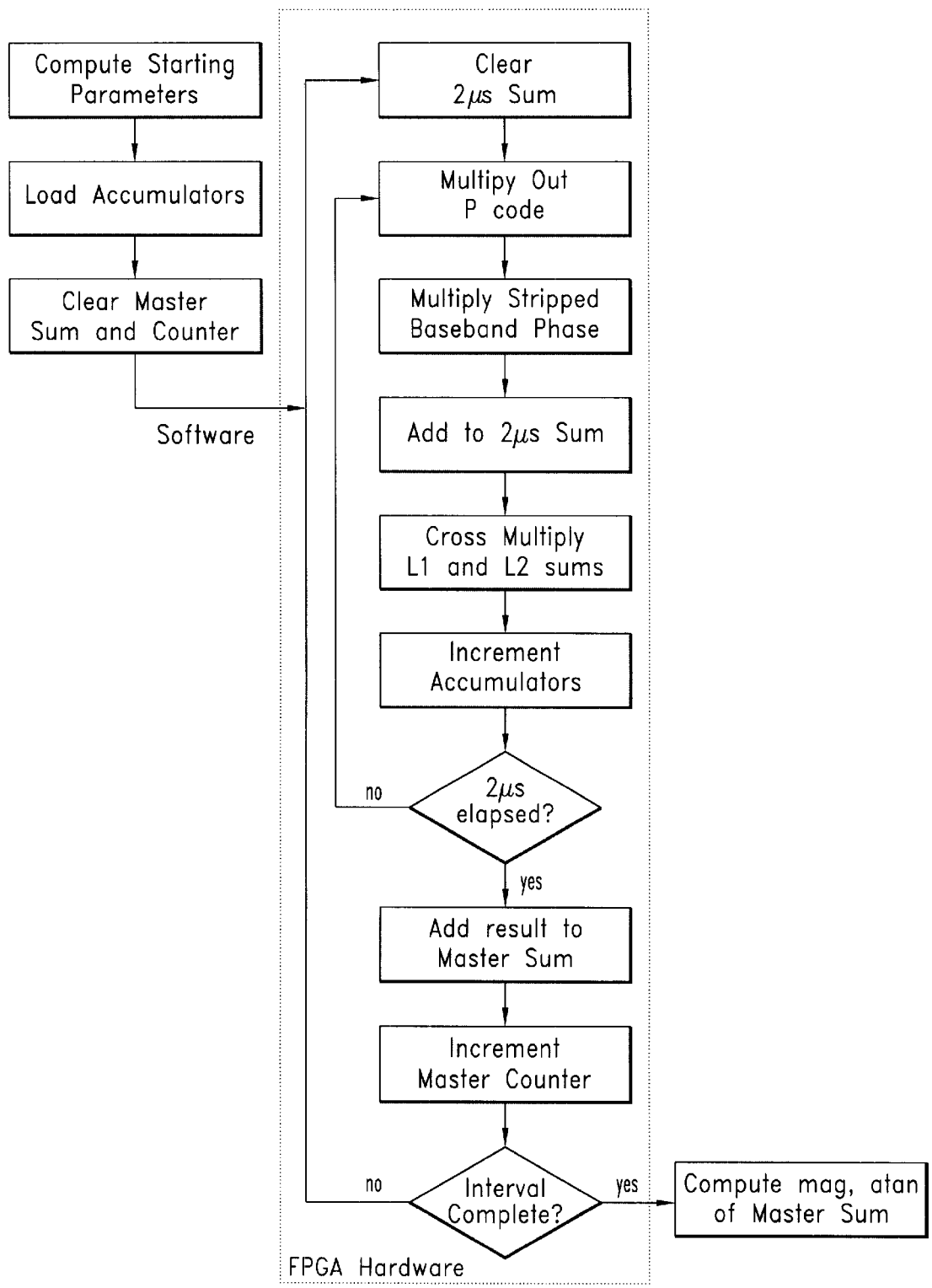
FIG. 13 is a signal processing flowchart for the preferred method.
Figure 14:
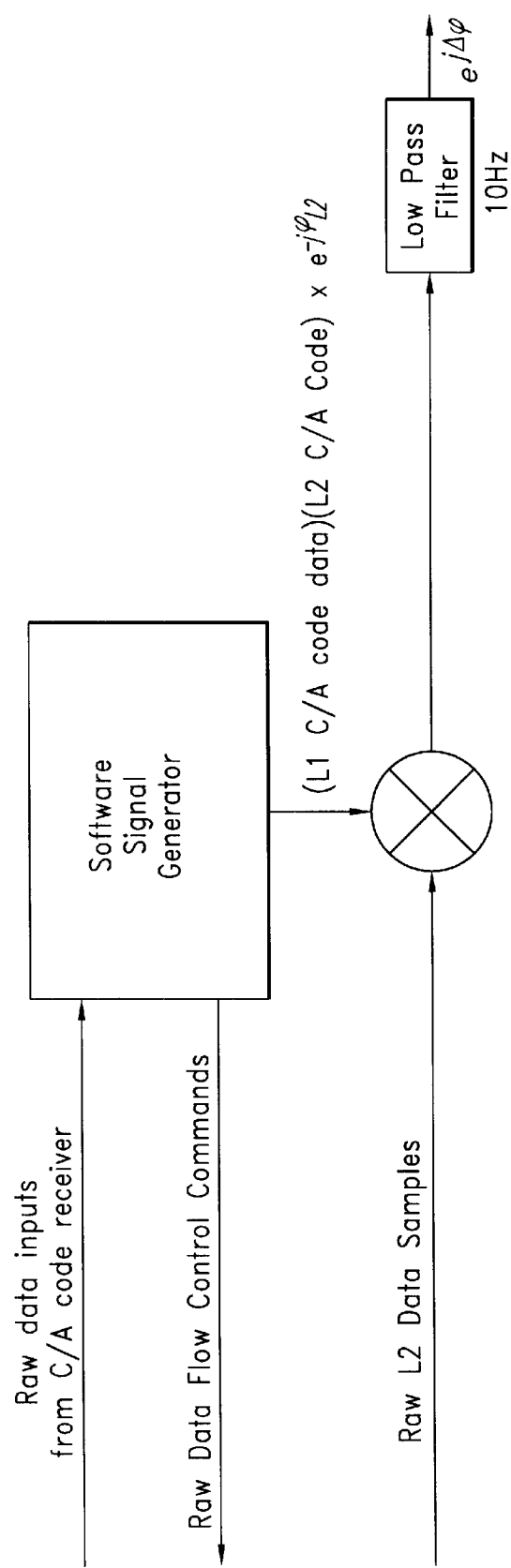
FIG. 14 is a schematic diagram of a preferred L2 C/A code signal processing architecture.
Figure 15:
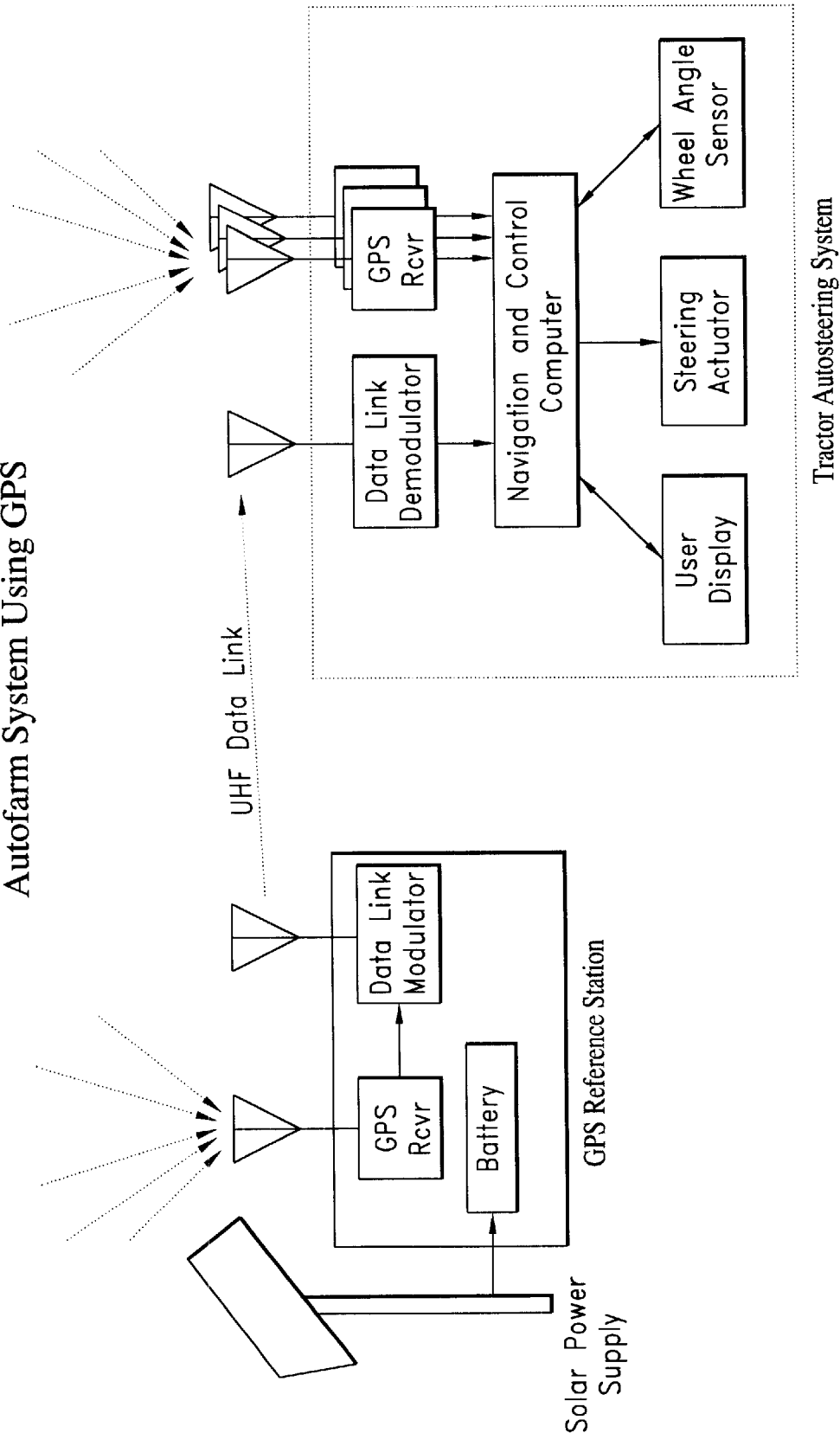
FIG. 15 is a schematic diagram showing application of the GPS system of the invention to the automatic guidance of farm equipment.
Figure 16:
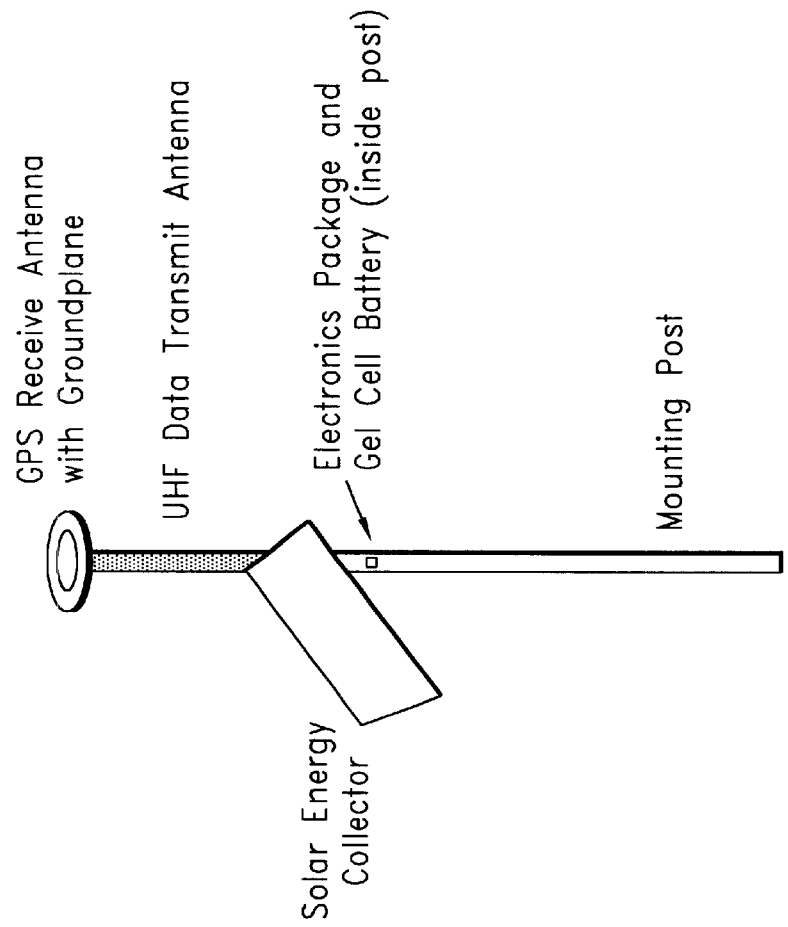
FIG. 16 is a schematic diagram showing the configuration of a low-cost, self-contained reference station for the automatic control of heavy machinery.
Figure 17:
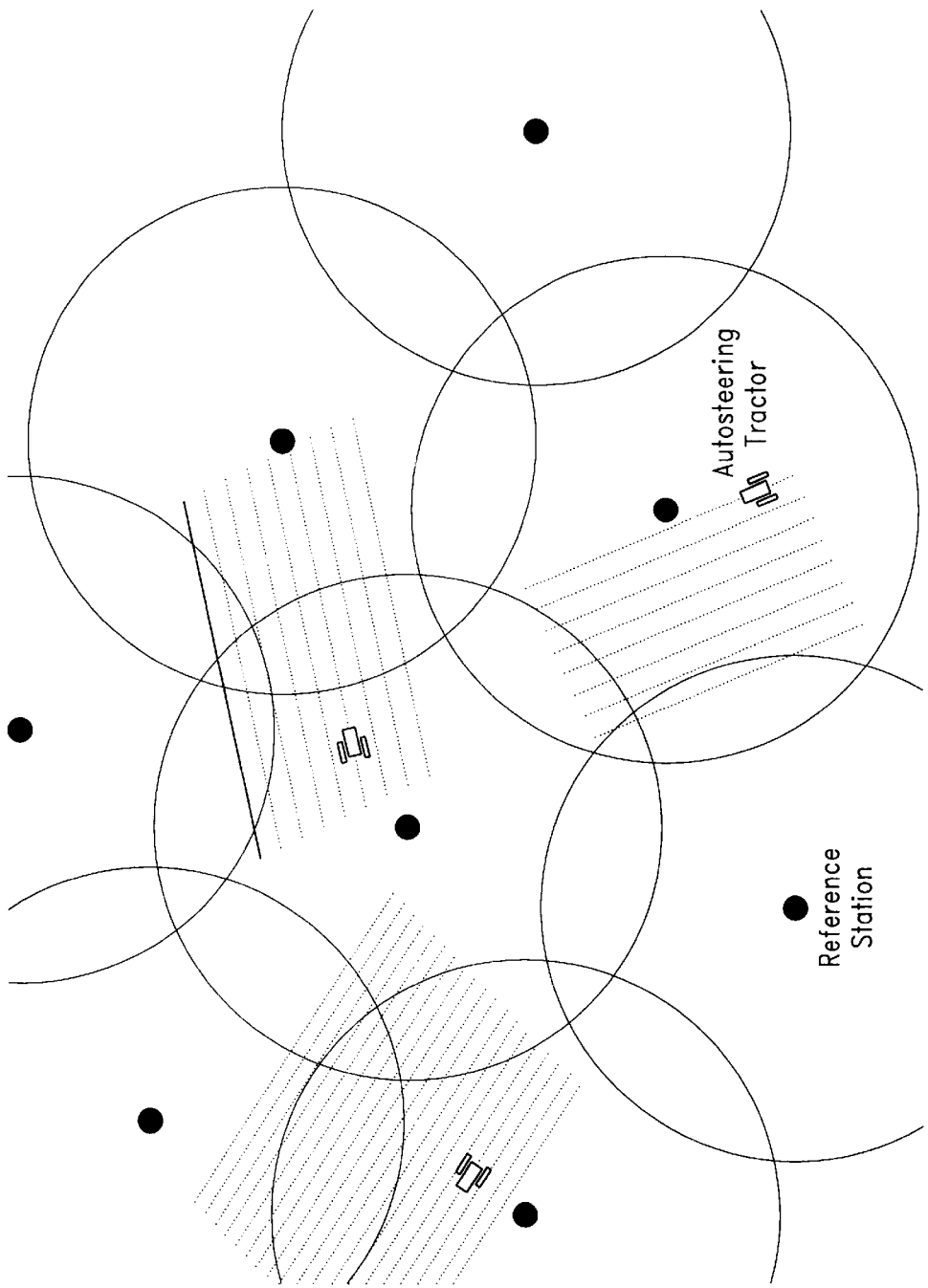
FIG. 17 is a schematic diagram of a distributed layout of reference stations for serving regional areas.

Figure [Direct Sample] shows an ideal architecture for hardware that utilizes the principles of the invention. A common clock drives a standard C/A code GPS chipset which in turn generates a coherent 40 MHz sampling clock for the L1 and L2 channels. C/A code carrier phase measurements are then taken synchronously with bursts of raw L1 and L2 quadrature samples. To minimize hardware, these samples may be taken directly at L band, although practical limitations on the sharpness of the anti-aliasing filters indicate that a downconversion design be used, as given in the preferred embodiment below. Two bits encode the raw L1 and L2 samples. An Interface Block captures the raw data, which, in varying forms of the invention, can buffer, preprocess, or directly pass the data to a computer or other form of digital signal processor (DSP).

Figure [Preferred Embodiment] shows the preferred embodiment. The most important difference between this version and the ideal hardware is that a downconverting front-end is used. This front-end is shown in Figure [Downconverting RF Section]. A single, common clock is still used to drive all r.f. and digital sampling components coherently.

Figure [Signal Processing Architecture] shows how the data is processed inside the digital processing components. First, an internal software signal generator synthesizes both the P-code and carrier phase for both L1 and L2. Once the receiver has acquired and tracked the signal, each of these signal components may be fed forward from the C/A code measurements that are being tracked concurrently. The raw, complex samples are computationally mixed to baseband by simply multiplying the generated signal by the incoming. To speed this mixing process, a one-step lookup table may be employed (see below). The mixed signal product is summed with a 2 ms period to wipe off the P-code and rotate the signal to baseband. The resulting L1 and L2 signals are mixed together to wipe off the residual W-code. The remaining signal is a baseband single-difference phase measurement for a given satellite that is essentially "frozen" in the I-Q plane. By integrating for 100 ms or longer, the noise is averaged down to obtain a useable signal. The hardware for the system is shown in Figure [Preferred Embodiment]. A single common oscillator (which may be tapped from the C/A code GPS receiver) drives the entire system. This need not be an exotic variety—a standard, low-cost 10.000 MHz TCXO good to 2.5 parts per million of frequency error will suffice. One example part is RAKON TXO200B.

All timing within the system is then derived from this clock. A synthesizer is used to generate a 40 MHz clock that is used for sampling the raw measurements using a 2-bit A/D converter and clocking them into a RAM memory for temporary storage.

A GPS chipset is commonly the basis for a commercially available C/A code GPS receiver. One example part is the MITEL chipset, which has a local integrated r.f. downconverter (part number GP2015) and signal processing correlator ASIC (Part number GP2021). In a conventional receiver which uses this chipset, a computer couples with the corr-elator chip in real time to close tracking loops on the various channels. The tracking loops provide raw measurements of pseudorange to the satellites. The computer then combines these measurements into a standard C/A code position fix.

It is not an object of this invention to treat the C/A code receiver as anything but a standalone, off-the-shelf component. It needs to be of sufficient quality to track GPS carrier phase, and it needs to accept an external clock input. It also needs to accept special, custom software specific to this invention. In the preferred embodiment, a Canadian Marconi Electronics "Superstar" miniature C/A code receiver is employed. This receiver is based on the chipset listed above.

It is imperative that the local oscillators and sampling all be derived from the same timebase throughout the receiver for this process to be successful. Tight attention to jitter among the various clocks synthesized from the master clock is required. However, slowly changing biases (over the course of seconds) and some crosstalk are tolerable because of the differential nature of the design that allows these effects to cancel out. Because of the precision required, the slightest carrier phase deviation in the receiver will end up producing an error in the P(Y) channels that is unacceptable. Fortunately, any minute deviations in oscillator stability will affect all components equally to first order, leading the residual error to cancel out as long as the clock jitter has been kept within limits.

The receiver depends upon the GPS signals having some known characteristics. As discussed previously, three signals are generated by each GPS satellite: L1-C/A, L1-P(Y), and L2-P(Y). An approximation for the signal, s(t), received at the user antenna terminals from satellite k for the C/A code can be represented as the following:

$$s_{L1-C/A}(t) = \sum_k a_k c_k\left(t - \frac{d_k + \delta_{kL1}}{c}\right)\sin\left(\omega_{L1}t - \frac{2\pi(d_k - \delta_{kL1})}{\lambda_{L1}}\right)$$

where t is GPS time, a is the signal amplitude for that satellite, c(t) is the $f_0$ rate (1.023 Mchips/sec) C/A code value (i.e., ±1) at that time, $d_j$ is the distance to the satellite, $\delta_{jL1}$ is the ionospheric delay, c is the speed of light, $\Omega_{L1}$ is the angular frequency of the GPS L1 signal, and $\lambda_{L1}$ is the L1 wavelength. Some factors, such as satellite and user biases are neglected in this simplification, but because the system is used differentially, the most important and relevant aspects of the signal are retained and represented here.

Similarly, the L1 and L2 versions of P code can be represented as follows $$s_{L1-P(Y)}(t) = \sum_k \frac{a_k}{\sqrt{2}} p_k\left(t - \frac{d_k + \delta_{kL1}}{c}\right) w_k\left(t - \frac{d_k + \delta_{kL1}}{c}\right)\cos\left(\omega_{L1}t - \frac{2\pi(d_k - \delta_{kL1})}{\lambda_{L1}}\right)$$

$$s_{L2-P(Y)}(t) = \sum_k \frac{a_k}{2} p_k\left(t - \frac{d_k + \delta_{kL2}}{c}\right) w_k\left(t - \frac{d_k + \delta_{kL2}}{c}\right)\cos\left(\omega_{L2}t - \frac{2\pi(d_k - \delta_{kL2})}{\lambda_{L2}}\right)$$

where p(t) is the 10 $f_0$ (10.23 Mchips/sec) known P code value (i.e., ±1) and w(t) is the unknown W code value (also ±1) at a two-sided bandwidth of approximately 1 MHz.

Figure [Sampled Dual-Frequency Signals] shows the L1 and L2 P code spectra superimposed on the 40 MHz sampling clock. These spectra are filtered to prevent aliasing using a bandwidth of 20 MHz prior to being sampled by the 40 MHz clock. This sampling frequency satisfies the Nyquist criterion that the sampling rate must be twice the bandwidth of the continuous signal so that the sampled signal is a perfect representation of the continuous signal.

A related issue is that of the bandwidth of the filters themselves. To employ a 20 MHz passband at 1,575.42 MHz with a steep cutoff requires a high Q filter. New technologies are beginning to allow this sharp filtering to be done at this frequency. The sharp filtering must be carried out to reject out-of-band interference, such as nearby cellular telephones. An example of the electrical components required is the specialized r.f. chip pair contained in IBM GPS receiver IBM43GAENGP0001. This receiver contains an integrated SiGe chip which carries out the bandpass, automatic gain control (AGC), and direct r.f. sampling functions using 2-bit quantization.

Using this chip or its equivalent would be the preferred embodiment because of its overall simplicity and ultimate low cost. However, because such technology may not be available on the market as a stand-alone product (it is not critical that direct downconversion be used), it is possible to construct the more traditional quadrature downconversion scheme shown in Figure [Preferred Embodiment]. This frequency plan employs multiples of 40 MHz to emulate the direct downconversion archetype. Figure [Sampled Dual-Frequency Signals] shows the frequency plan for such 40 MHz sampling and its corresponding digitally sampled output.

Conventional off-the-shelf filters and components are used to construct IQ processing with 20 MHz selectivity and 2-bit A/D conversion before sampling at the same 40 MHz rate as shown in Figure [Storage Format]. The computer issues a pulse (time-tagged in GPS receiver clock time) to the Field Programmable Gate Array (FPGA) which collects a sequence of 2 (I and Q) 2-bit samples for each of 2 frequencies (L1 and L2)—a 1-byte swath as shown in Figure [Storage Format]. If 0.1 seconds of elapsed time are used as a sample interval, then 4 million 1 byte samples are collected (a total of 4 megabytes of data). In the preferred embodiment, the DSP is set up so that it can access these samples directly (internally).

We define sequences $s_{L1}[n]$ and $s_{L2}[n]$ of complex samples from the L1 and L2 sampling buffers.

For notational convenience in calculating number and type of computer processing operations, we define N to be the number of samples collected in the data buffers. We will address sequences of length N using index n, and we will address downsampled sequences of length N using index m.

To resolve cycle ambiguities, it is desired to determine the differential phase, $\Delta_{\phi k}$, between L1 and L2 for each satellite k of those in view. One object of this invention is to describe a how the raw samples, $s_{nL1}[n]$ and $s_{nL2}[n]$, can be converted in closed form to the desired differential phase angles.

A simplified overview of the signal processing plan is shown in Figure [Signal Processing]. Here it is shown how the computer uses its knowledge of the C/A code carrier phase from the C/A code receiver to coordinate the flow of data from the sample buffer into the signal processor. When appropriate, the sample buffer is read out and processed. The computer synthesizes the appropriate code and carrier to best match the incoming P code code and carrier for each band. The result is low pass filtered over a 500 kHz bandwidth to wipe off the P code and leave both carriers at baseband. The two signals are then cross correlated (a complex difference for the carriers) then averaged to attenuate the remaining noise. The result is a differential, dual-band carrier phase effectively "frozen" at baseband.

This is accomplished, as shown in Figure [Preferred Signal Processing], by using a low pass filter to wipe off the P code and leave the L1 carrier at baseband. The cross correlation between L1 and L2 is carried out without stripping off the P code from L2. The P code is stripped off downstream by the 10 Hz low pass filter, thereby obviating the need for another filtering step. When the data is represented with the optimum number of bits, this architecture yields the simplest processing.

The first processing step is to use the C/A code signal from the conventional GPS receiver to create an estimate of what the incoming P-code and carrier phase must be. There will naturally be biases present in this generation process due to the various propagation delays and advances in effect. However, the essential key is that these biases should be effectively constant if the secular components of the measurements are to be made coherent. Therefore, the code and carrier phase of the C/A code receiver must be mapped into the estimated code and carrier of the buffered data samples.

The P code generation must first have its own timing reference against which to compare the incoming signal. We define $t_R$ to be receiver clock time such that $t_R = t_{R0} + nT$. We use a mapping between t (representing GPS time) and $t_R$ such that $t_R = t + \tau$, where $\tau$ is the receiver clock bias.

Defining pseudorange ($\rho$) as follows:

$$\rho = \frac{d + \delta}{c} + \tau$$

then the time derivative (given with respect to receiver time) becomes $$\rho Y' = \frac{dY}{c} + \tau Y'$$

The C/A code receiver tracks the code in real time with code generated by the code generator running $C(t_R - \rho)$. At the time the sample buffer is commanded to fill, the starting time tag, $t_{R0}$, is recorded along with a best fit estimate of the profile of $\rho$ over the time it takes to fill the buffer. If one is only concerned about recovering relative carrier phases between L1 and L2, then it is sufficient to use a first order approximation. By taking the average value of $\rho$ and an average of its incremental change over each update, the argument of the C/A code generated by the receiver over the complete sample interval tracks the incoming signal as follows:

$$c_k\left(t - \frac{d_k + \delta_{kL1}}{c}\right) = c_k(t_R - \rho_{kL1}) = c_k(t'_k)$$

where $$t'_k \equiv t_R - [\overline{\rho}_{kL1} + \overline{\rho}^Y_{kL1}(t_R - t_{R0})]$$

A discrete time sequence of transformed receiver time may also be created for convenience as follows:

$$t_k[n] = t_{R0} + nT - [\overline{\rho}_{kL1} + \overline{\rho}_{kL1}^Y nT]$$

Defining a new parameter, $\Delta\delta_j$, to take into account differential ionospheric effects between receiver frequencies (and implicitly neglecting any difference between the two L1 ranging signals as well as a single inter-channel bias), $$\delta_{kL2} = \delta_{kL1-C/4} + \Delta\delta_k$$

We can then substitute this approximation into the wideband P(Y) code signal at the antenna terminals to see the code generation arguments advancing in lockstep as follows:

$$p_k\left(t - \frac{d_k + \delta_{kL1}}{c}\right) = p_k(t'_k) \text{ and } p_k\left(t - \frac{d_k + \delta_{kL2}}{c}\right) = p_k\left(t'_k - \frac{\Delta\delta_k}{c}\right)$$

These time base transformations also apply to the W code.

The carrier must be treated with considerable rigor because it is an object of this invention to rely on it to ultimately provide precise measurements that deviate no more than one percent of a wavelength (less than 5 picoseconds) from their true value. The processing will provide for a coherent feedforward of the C/A code carrier to the L1 and L2 processes accurate to this level.

A sequence of the actual carrier values from the C/A-L1 tracking loop are recorded in a software memory buffer internal to the computer concurrently with the data collection of the raw L1 and L2 r.f. samples. Sampling at an interval of 20 milliseconds (50) Hz should typically be sufficient to handle the various constraints of oscillator stability and user dynamics. The Allan variance of a standard quartz oscillator is better than $10^{-12}$ over time periods less than a second. Therefore, we would expect to see errors on the order of millimeters for a C/A code carrier sample interval of 20 milliseconds. As to user dynamics, the tracking loop noise bandwidth is set as large as 10 Hz. Although quasi-static operation is contemplated for the receiver in the farming application, there is no reason why it cannot be applied to dynamic situations. As long as the user dynamics do not exceed typical operating bandwidths, say 10 Hz, then a 50 Hz sampling rate should also be sufficient for this type of disturbance. Satellite motion and other error sources are relatively benign at these time scales.

We define the phase of the carrier as received by the GPS receiver as $$\phi_{kC/A}(t) = \omega_{L1} t - \frac{2\pi(d_k - \delta_{kL1})}{\lambda_{L1}} + b_{C/A}$$

where the unique bias, $b_{C/A}$, is attributable to the unique signal path traveled by the signal to the C/A code GPS receiver.

The carrier phase with respect to the GPS receiver reference time as measured by the receiver itself is then as follows:

$$\varphi_{kC/A}(t) =$$

$$\omega_{L1}(t - t_R) - \frac{2\pi(d_k - \delta_{kL1})}{\lambda_{L1}} + b_{C/A} = -\omega_{L1}\tau - \frac{2\pi(d_k - \delta_{kL1})}{\lambda_{L1}} + b_{C/A}$$

By interpolation, the above measured carrier phase in the receiver may be transformed to receiver clock time, i.e., $\hat{\varphi}_{KC1A}(t_R)$.

The carrier phase from the C/A code channel will be applied to both the L1 and L2 raw samples to identically remove all effects of oscillator noise and user dynamics on the P(Y) code channels. Two transformed variables are created:

$$\varphi'_{kL1}(t_R) = \hat{\varphi}_{kC/A}(t_R) + (\omega_{L1} - \omega_{LO(L1)})t_R$$

$$\varphi'_{kL2}(t_R) = \frac{\lambda_{L1}}{\lambda_{L2}} \hat{\varphi}_{kC/A}(t_R) + (\omega_{L2} - \omega_{LO(L2)})t_R$$

The term $\Omega_{LO}$ is the angular frequency of the local oscillator, if any. The value for both local oscillators in the preferred embodiment is $2\pi$ (1.4 GHz).

A sequence of C/A code carrier phase estimates is taken directly from the receiver tracking loop and represented as follows:

$$\Phi_k[mL] = \phi_k'(t_{R0} + mLT)$$

where L is the ratio of samples in the downsampled measurements buffer for each sample in the C/A code carrier phase sample buffer. L=(20 ms)/T=800,000 in the preferred embodiment.

It is important to be rigorous about keeping track of the initial condition, $t_{R0}$, in order to maintain a constant L2-L1 phase bias from one sample burst to the next.

Linear interpolation may be used to reconstruct the carrier. An impulse response for a linear interpolator is given as follows:

$$h_{lin}[n] = \begin{cases} 1 - \frac{|n|}{L}, & |n| \leq L \\ 0, & \text{otherwise} \end{cases}$$

Therefore we can define full-length carrier phase correction sequences $$\varphi'_{kL1}[n] = h_{lin}[n] * \Phi_{kL1}[n]$$

$$\varphi'_{kL2}[n] = h_{lin}[n] * \Phi_{kL2}[n]$$

In the preferred embodiment, the L1 and L2 rates are summed together as discussed below, with the interpolation actually performed using a 32-bit fractional phase accumulator that is updated for each discrete step m. The 6 most-significant bits of the accumulator are used in a 64-element lookup table to find the sines and cosines for the full quadrature multiply to occur next.

With this preparation given above, the differential phase for each satellite k may be calculated in the following single step:

$$\Delta\varphi_k = \arctan_2 \sum_m \sum_{i'=mM}^{mM+M-1} \left[\sum_{i=mM}^{mM+M-1} p_k[t_k'[i]]s_{L1}[i]e^{-j\varphi'_{kL1}[i]}\right]^*$$

$$[p_k[t_k'[i']] - \Delta\delta_k/c]s_{L2}[i']e^{-j\varphi'_{kL2}[i']}]$$

For each frequency channel, the code product is formed to strip off the P code from the incoming signal. Identically, the carrier is downconverted to baseband through a complex product rotation. Consecutive products are then summed for about 2 ms (M=80 consecutive samples) to approximately line up with the W code. This step averages out the P code and much of the input noise. As shown in the equation above, the result is downsampled by a factor of L prior to final averaging.

No assumption is made about the structure of the W code other than that it has a bandwidth of about 500 kHz. Other bandwidths may be assumed by simply varying M. Although more elaborate schemes may be employed herein to try to take advantage of a more detailed knowledge of this signal, it is an object of this invention to avoid encroaching on any secure aspects of the signal. It can be shown that the above unsynchronized averaging approach given above results in no more than approximately 3 dB less performance than perfectly synchronized averaging.

The two frequency channels are then cross correlated against each other at baseband, then averaged for 0.1 seconds or more—the full length of the buffer. By following the processing steps outlined above, the differential carrier phase between the L2 signal and the L1 signal is measured for each satellite in view in a snapshot form. The system is designed such that this phase effectively holds constant for each burst of data and from one burst to the next. Therefore, no tracking loop is needed outright. If further noise reduction is required over a short period, straight averaging or other types of more advanced filtering can be used, such as a second order tracking loop rendered in post processing software downstream of the signal processing.

The receiver is configured to keep calculating this differential phase measurement synchronously. Depending on processing power, the output may be in near real-time, or may come every few seconds. Because the $\Delta\phi$ angle does not usually move very quickly over time periods of minutes, multipath is typically the largest error source for cycle ambiguity resolution. Multipath dominates receiver noise figure and performance losses due to the ratio of captured signal time to processing time. Therefore, even given the simplicity of the receiver hardware, there is no appreciable loss in overall system performance.

To complete the description, one step is needed to start up the system. Initially, the relative ionospheric delay between the two frequencies L1 and L2 is not known. The data in the buffer must be converted into an L2 signal amplitude, A. This is done by repeating the summation step for several values of $\Delta\delta$ and taking the magnitude of the result instead of the $\arctan_2$:

$$A(\Delta\delta_k) = \left|\sum_m \sum_{i'=mM}^{mM+M-1} \left[\sum_{i=mM}^{mM+M-1} p_k[t_k'[i]]s_{L1}[i]e^{-j\varphi'_{kL1}[i]}\right]^*\right.$$

$$\left.[p_k[t_k'[i']] - \Delta\delta_k/c]s_{L2}[i']e^{-j\varphi'_{kL2}[i']}]\right|$$

This function will outline the familiar triangular correlation peak with a 30 m chip spacing. Upon startup, two or three trial values can be used to center $\Delta\delta_k$ for maximum amplitude output. For simplicity, one may neglect ionosphere error when correlating L1 and L2 W code.

Therefore, the system is able to start producing differential phase measurements as soon as the C/A code carrier tracking receiver component carries out its first position fix.

In the case of an autosteering system, these carrier phase measurements are then used to calculate the cycle ambiguities in the between the reference station and the mobile unit and to continue monitoring ongoing operation. The L1 carrier phase measurements may then be combined into a centimeter-level position fix and directed to the autopilot. Any deviations in course trajectory are immediately detected by the GPS system and a correction is sent to the autopilot to compensate.

The following is an analysis of the incoming carrier phase to show why the receiver works. Derived from the initial expressions given for the incoming signal, the capture buffer contents are given by the following expressions plus a noise term, n(t), and a constant channel/line bias, b.

$$s_{L1}[i] = \sum_k a_k \left[ c_k(t_R - \rho_k)e^{-j\frac{\pi}{2}} + \frac{1}{\sqrt{2}} p_k(t_R - \rho_k)w_k(t_R - \rho_k) \right]$$

$$e^{j\left(\omega_{L1}(t_R - \tau) - \omega_{LO(L1)}t_R - \frac{2\pi(d_k - \delta_{kL1})}{\lambda_{L1}} + b_{L1}\right)} + n_{L1}[i]$$

$$s_{L2}[i] = \sum_k \frac{a_k}{2} p_k\left(t_R - \rho_j - \frac{\Delta\delta_j}{c}\right) w_k\left(t_r - \rho - \frac{\Delta\delta_j}{c}\right)$$

$$e^{j\left(\omega_{L2}(t_R - \tau) - \omega_{LO(L2)}t_R - \frac{2\pi(d_k - \delta_{kL2})}{\lambda_{L2}} + b_{L2}\right)} + n_{L2}[i]$$

The C/A code GPS receiver will track the C/A code carrier, but with a different bias. This is because the C/A code receiver tracks through a different signal path than the dual-frequency sample circuitry. From the above equation for receiver-relative C/A signal carrier phase, we obtain $$\varphi_{kC/A}[i] = -\omega_{L1}\tau - \frac{2\pi(d_k - \delta_{kL1})}{\lambda_{L1}} + b_{C/A}$$

Applying the processing steps to the raw inputs strips off the P code, rotates the carrier phase to baseband, and averages down the noise by the ratio of the input to output bandwidths, 13 dB. A new index m is used as before to indicate that we have averaged for 80 samples across a W code chip and downsampled.

$$s'_{kL1}[m] = \frac{a_k}{\sqrt{2}} \tilde{w}_k(t_R - \rho_k)e^{j(b_{L1} - b_{C/A})} + \tilde{n}_{kL1}[m]$$

$$s'_{kL2}[m] = \frac{a_k}{\sqrt{2}} \tilde{w}_k\left(t_R - \rho_k - \frac{\Delta\delta_k}{c}\right)e^{j\left(\frac{2\pi\Delta\delta_k}{\lambda_{L2}} + b_{L2} - \frac{\lambda_{L1}}{\lambda_{L2}}b_{C/A}\right)} +$$

$$\tilde{n}_{kL2}[m]$$

Without loss of generality, there is negligible signal processing error introduced by a straight multiply of the codes. The dominant error introduced by the digital correlation of the code is that the "perfect" code generated by the computer is not bandlimited. However, because the measurements are 2× oversampled, only the part of the second sidelobe and beyond are starting to contribute to any modeling error. Meanwhile, since the actual measurements coming in are band limited anyway, the digital sequence fully represents the signal component of the continuous input.

Cross multiplying these two terms, neglecting the effect of ionosphere on the W code (because the code chip length of approximately 600 m is so much longer than the ionospheric effect) yields the following quasi-static result:

$$s'^*_{kL1}[m]s'_{kL2}[m] = \frac{a_k^2}{2\sqrt{2}} e^{j\left(\frac{2\pi}{\lambda_{L2}}\Delta\delta_k + (b_{L2} - b_{L1}) + \left(1 - \frac{\lambda_{L1}}{\lambda_{L2}}\right)b_{C/A}\right)} + \tilde{n}_k[m]$$

The final step provides sufficient averaging to reduce the effects of the noise term. We can then easily back out the magnitude and phase of the complex signal as shown above.

This final result reveals not only the ability of the receiver to measure the ionospheric delay, $\Delta\delta$, it also shows how the wide lanes can be constructed if the biases are decomposed to include an integer component, n, for both L1 and L2:

$$\Delta\varphi = \frac{2\pi}{\lambda_{L2}}\Delta\delta_k + 2\pi\left[(n_2 - n_1) + \left(1 - \frac{\lambda_{L1}}{\lambda_{L2}}\right)n_1\right] +$$

$$(b'_{L2} - b'_{L1}) + \left(1 - \frac{\lambda_{L1}}{\lambda_{L2}}\right)b'_{C/A}$$

$$= \frac{2\pi}{\lambda_{L2}}\Delta\delta_k + 2\pi\left[n_2 - \frac{\lambda_{L1}}{\lambda_{L2}}n_1\right] + b'$$

Having described the general functioning of the receiver and how its output is obtained, we now provide more practical details of how the receiver is implemented for low cost, efficiency, and throughput.

The digital processing section of Figure [preferred embodiment] can take several forms. In the form described here, it can be a sample buffer 4 Megabytes long as described previously. This sample buffer is connected to a digital signal processor or other computer processor, such as an Intel 486 or TI TMS320. The DSP reads out the buffer and processes the data for each of the satellites in view.

Another variation on the invention is to use the digital processing section as a direct memory access (DMA) device that loads the data from the r.f. front end of the receiver directly into the computer or DSP. The computer or DSP can either store the data for processing in batch form, or, if the computer is fast enough, can process the measurements in real time using exactly the same processing as described above.

Yet another variation on the invention is to employ a hybrid hardware/software solution. A hardware memory buffer is used to capture a sequence of data in hardware as in the first example. However, in this case, a specialized digital signal processor is used in concert with the computer to process the signal captured in the data buffer using an FPGA with a customized program rather than using the computer as shown in Figure [Custom DSP]. The FPGA contains the accumulators and code generators as described herein for the computer-based version. However, these run in hardware, but are initialized for each processing run by the computer with their appropriate values. Instead of using lookup tables, most results are actually computed at each step using digital logic. This approach has the advantage that it is very fast, uses little power, and eliminates the need for a dedicated DSP. In fact, the processing load to drive the FPGA to get dual frequency measurements is so low, the ordinary, low-cost C/A code receiver used to track the carrier has enough capacity to do all the dual frequency setup and processing itself. This approach is described in further detail below.

The digital signal processing implementation for the preferred embodiment is given next. Inside the computer, it is important that a minimum of processing resources be employed. The entire sequence of processing has essentially been reduced to memory fetches and accumulator updates—both of which are maximally efficient. Through the use of lookup tables, no higher-level operations are required.

Starting with the carrier generator, Figure [Fast Lookup Table] shows how an accumulator is used to synthesize this signal. Prior to processing the sample buffer, the accumulator is initialized with the initial value of the carrier phase for the run, while the rate register is initialized with the precomputed doppler for the run. These parameters are tied to receiver time, $t_R$, and are scaled to 32 bits. Then, the accumulator provides the instantaneous and accurate carrier phase for each time step.

The next step is to assemble a lookup table address to carry out the P code wipe off and baseband downconversion all in one step. The uppermost 5 bits of the accumulator are assembled into a lookup table. To adjoin these bits come 4 bits of raw data, 2 bits each of I and Q. Finally, the current P code bit is adjoined to complete the digital address for the lookup. The result from the lookup table is then the in-phase and quadrature components of the baseband multiply.

The computer then sums these outputs 80 times, carries out the cross correlation multiply between L1 and L2, then sums the result for the entire buffer length. The cross correlation multiply is fixed point and does not occur often enough to take up significant processing time.

A P code generator programmed in the computer generates the sequence of ±1 values as a function of receiver time, $t_R$. A 64-bit accumulator is sufficient to represent $t_R$ with the decimal place split halfway at 32 bits. As an independent check, we note that for a one second interval, the number of chips fills up $\log_2 10,230,000=24$ bits, plenty of margin for 32 bit representation.

In the preferred embodiment, a lookup table is also used to compute the P code. Since the P code is synthesized using separate constituent codes (see GPS ICD-200 Signal Specification), each of these codes is generated by separate lookup tables. Prior to a processing run, the correct initial accumulator values are set as a function of $t_R$. Each of the accumulators is run at the calculated pseudorange rate. The accumulator values are used as indices to look up each of the four constituent codes, which are then combined to derive the P code value itself in a computationally efficient manner.

By taking advantage of the fact that the L1 P code leads the L2 P code from the increased ionospheric delay of the the lower-frequency L2, it is possible to formulate a code generator that only requires each chip to be calculated only once to save processing time. After that, the variations in phasing can be accommodated by separate logic keyed to the timing accumulators.

In fact, the lookup table approach can be generalized into one single parallel operation. Figure [Parallel] shows how the P code from both channels, the synthesized carrier phase from both channels, and the raw measurements, may all be concatenated to form a single 20-bit wide address for a lookup table. This table may be conveniently precomputed and stored in a typical PC-type architecture computer. The output of the lookup is four, eight-bit baseband in-phase and quadrature components of pre-crosscorrelated signal representing the mathematical processing sequence outlined above. To save on some processing cycles, these values are already prepositioned for the following summation step which occurs thereafter. In other words, as long as there is no overflow, the summation for all four baseband processes can be carried out on the same 32-bit word.

The integration is continued for L sampling steps to form $I_{L1sum}$, $Q_{L1sum}$, $I_{L2sum}$, $Q_{L2sum}$ at baseband. Then these sums are cross correlated as follows:

$$I_{total} = \sum_m (I_{L1sum}I_{L2sum} + Q_{L1sum}Q_{L2sum})$$

$$Q_{total} = \sum_m (I_{L1sum}Q_{L2sum} + Q_{L1sum}I_{L2sum})$$

These total sums of I and Q provide the final result.

Flowcharts are also given for the signal processing. The first flowchart, Figure [Signal Processing Flowchart], shows the core signal processing element of the digital signal processor. This is the portion that takes the raw samples and converts them to a differential phase, or L2 minus L1 for a given space vehicle (SV). The core signal processor may be invoked several times for a given data set. In steady state, the core signal processor is invoked once for each satellite in view. Furthermore, when it is necessary to fine tune the estimate of overall ionospheric error (i.e., the code bias between L1 and L2 for a given satellite), the core signal processor is invoked again to find the center of the peak, as is described above.

For the preferred signal processing architecture, the processing begins for a given space vehicle (SV) by initializing all the accumulators with their values calculated from the C/A code tracking loop. Once the accumulators—including those for the P code generators—are loaded with their initial values and constant step size for each iteration, they can be updated with a single binary add operation. Two loops are indicated. The inner loop is set up as a low pass filter with a bandwidth of 500 kHz. In the preferred embodiment, this filter is set up as a boxcar integrator set approximately to the W code chipping interval of 2 $\mu$s. Through mixing the buffered samples with the synthesized P code and carrier phase generated from the accumulators, it is in this inner loop where the P code is multiplied onto the incoming signals and the signals rotated to baseband. Each step is carried out by looking up baseband values of I1, Q1, I2, Q2 in the lookup table, where the inputs are the P code, data samples, and L1 and L2 phase accumulator values. The next step is to complex multiply the summed L1 and raw L2 samples to wipe off the W code and form the baseband L2 minus L1 difference. A delay buffer of 80 samples (one W code chip) is applied to the raw L2 samples so that they are perfectly aligned with the output of the boxcar integrator for L1. The outer loop is then used for cumulating this cross-correlated signal and averaging out the L2 P-code and the residual noise. In the preferred embodiment, this is a boxcar integrator with a 100 ms interval. As a final step, the computer calculates the arctangent of the I and Q sums to obtain the phase output of the receiver.

To start the system operating, a specific sequence of operations must be carried out using the apparatus. This sequence begins by the C/A code receiver powers up at both the reference base station and the mobile unit and commences tracking satellites and performing position fixes. The dual-band receiver described herein is combined with the output from the C/A code receiver to produce raw dual-band phase measurements at each receiver. Standard algorithms are used to convert these raw dual-band measurements into an accurate, centimeter-level solution. From then on, the C/A code portion of the receiver takes over as above, accurately retaining this initialization to continue its guidance and control function. During steady state operations, the dual-band component need not necessarily be used, except as a monitoring check or in situations where the Earth's ionosphere may be a factor.

Described here are several alternate implementations of that system which may provide improved performance at lower cost depending on the specific circumstances. These are based on a hybrid hardware/software approach.

Several new implementations are described here, all of which use the FPGA digital signal processor shown in Figure [Preferred Custom DSP Embodiment] as a "co-processor" to assist the computer processor to make more optimal use of each piece of hardware. By doing so, the computer processor can be lower speed, use less power and be less expensive. In fact, in all of the implementations discussed here, the preferred embodiment uses the processor on the ordinary C/A code GPS Receiver as the processor, eliminating the need for a second (or more powerful first) processor and the complexity of interfacing the two processors.

The algorithm for computing L2 minus L1 carrier phase based on sampled data has already been laid out in the flowchart of Figure [Signal Processing Flowchart].

We assert that any of these steps could in principle be performed on either an FPGA or on a computer. Specifically, we break down these tasks to perform the beginning and ending steps on the computer and all others on the FPGA as shown in Figure [Custom DSP Flowchart]. Because the FPGA can be customized to perform such custom steps in parallel, it is likely to perform better than a processor clocked at the same rate.

The only difference in the steps is that a lookup table is not used. Rather, the quantities are synthesized directly using hardware multiplies. The programming for the FPGA is carried out in a similar fashion to programming the computer or DSP. A high-level programming language such as VHDL or Verilog is used.

This partitioning of tasks is the basis for the implementations discussed here. There exist low-cost, low-power FGPAs that can perform the necessary tasks for at least one satellite in real-time (for example, the Xilinx Spartan II family).

In the first implementation, there is no RAM buffer and a single satellite is processed in real-time. Both receivers in the differential pair (reference and mobile) would use the same algorithm to ensure that they sampled that same satellite at the same time to eliminate any temporal drift between L1 and L2 cause by the ionosphere. All of the satellite L2 phases can be projected to a common time. If 100 ms of data are used for each satellite, it takes 1.2 sec to collect 12 channels worth of data.

The second implementation is a slight modification on the first to be more robust to receiver-specific errors that could cause small variations in the L2-L1 phase over the second or so between the first and $12^{th}$ channel samples. The modification is to process 2 satellites simultaneously on the FPGA. The first sample might be satellite A and satellite B, the second sample might be satellite B and satellite C, the third satellite C and satellite D and so on. Alternatively, a high-elevation "master" satellite is sampled at each time (A and M, B and M, C and M, D and M and so on). Any drift between samples is observable due to the fact that common satellites exist between samples. In real-time it is determined if such errors exist (they could be a function of temperature or other environmental condition); if not, the common satellite requirement ae removed and the data is processed twice as fast (A and B, C and D, E nd F, and so on).

The third implementation is to buffer the sample data in RAM and to process one or more channels at a time by reading the data from RAM and processing it sequentially. The processor initializes the FPGA co-processor for a given satellite (or set of satellites) and initiates the co-processing. The co-processor then reads the buffered data from RAM and performs the co-processing for that satellite (or set of satellites). It then indicates to the processor that it has completed processing, whereby the processor reads the results, initializes the next set of satellites, and so on. After all satellite processing is complete, the processor sets up the FGPA co-processor to capture another set of data. This has the advantage of synchronous samples for all satellites. If an SDRAM controller is incorporated into the FPGA, the RAM buffer can be inexpensive SDRAM. The total cost of the FPGA and RAM can be less than $50 using current technology. In the preferred embodiment, an SDRAM of 32 MB allows 0.8 seconds worth of data to be buffered and is still quite inexpensive.

A fourth implementation is a slight modification to the first. The modification is to double the clock frequency internal to the FGPA to double the speed of processing the data. If two satellites are processed at a time, and the speed of co-processing the data is doubled, it takes 0.3 seconds to co-process 12 satellites worth of 100 msec sample data (not including the 100 msec to capture the data). One satellite (or group of satellites) could be co-processed during the capture process.

To simplify the co-processor channel processing (with the goal of simultaneously co-processing as many channels as possible), the processor can select sample times for which there will be no X1 or X2 rollovers in the P-code generator. Nothing in this system requires that the carrier phase to be tracked continuously. Since the X1 and X2 periods are about 1.5 seconds and since all satellites X1 and X2 phases are in phase to within a few hundred milliseconds, it is possible to find appropriate sample times at least once every few seconds.

While it is an object of this invention to passively monitor and utilize the GPS signals–including possibly the unknown Y code, the invention is incapable of being used to defeat the original intent of the Y code. This is because (1) no militarily useful information is derivable about the Y code, and (2) any information that is recovered must still be processed, thereby introducing a significant lag. It is too late to repackage this information and transmit it to a target receiver faster than the time it would take the true signal to arrive normally, directly from a GPS satellite.

One feature of the invention is that the system is able to satisfy all of the above requirements with simple, low-cost hardware. In its most specific implementation, the system works with GPS satellites. However, for added performance, the system may be augmented to make use of Low Earth Orbiting (LEO) satellites (such as Globalstar, Iridium, and Orbcomm) and pseudolites of many varieties. Another key aspect of the invention is that the apparatus is general enough to accommodate these additional signals easily depending on the application.

One way that the receiver could be used in a broader way is the example of C/A code broadcast on the L2 channel. This broadcast will be provided on upcoming GPS Block IIF satellites. As shown in Figure [L2 C/A Code Signal Processing Architecture], the L1 C/A code can be used to generate a feed-forward C/A code signal for L2 that is correlated with the incoming L2 satellite signal. The resulting output is low-pass filtered to provide a quadrature readout of the relative carrier phase between L1 and L2.

In one application, the receiver is used in the guidance system for an automatically steered farm tractor, as shown in Figure [AutoFarm System]. Software inside the C/A code portion of the receiver allows it to track the carrier phase of the GPS signal to sub-centimeter level. During steady state operations, known integers (solved in response to their initial cycle ambiguities) are added onto these raw measurements to produce accurate ranging measurements. These range measurements are used by the system to generate centimeter-level position fixes at an output rate of 10 Hz. These position solutions are directed to the autopilot portion of the system and used to guide and control the heavy machinery, such as a farm tractor in real time. The steering position feedback readout is used to linearize the hydraulically driven steering actuator. The user touchscreen display is used to command and control the overall system functions.

The reference base station is shown in Figure [Physical Configuration]. Because the dual-band receiver can be built at very low power and cost, the reference base station consists only of the following: (i) the dual-band receiver disclosed herein, (ii) a data link transmitter that broadcasts the receiver's raw data on the UHF license-free band, and (iii) a solar cell and battery to keep the unit powered without the need for frequent maintenance. As shown in Figure [Distributed], these base stations may be distributed throughout a farming region to provide continuous coverage to any tractor in the vicinity. The low cost of these units saves the farmer from having to adopt more expensive guidance solutions should he wish to take fall advantage of autofarming.

It will be evident to those skilled in the art that many other variations of the invention are possible that would fall into the spirit and scope of the claimed invention.

What is claimed is:

1. Hardware, wherein a GPS C/A code and carrier tracking component is coupled to an L1 and L2 band sampling component, where said sampling component is coupled to a digital signal processing component, wherein the internal timing of each of said components are carrier phase coherent, and said digital signal processing component operates on a specified segment of data from said sampling component.

2. Hardware of claim 1, wherein the digital signal processing component includes a sample RAM and a computer.

3. Hardware of claim 2 where the computer includes an Intel 486 microprocessor.

4. Hardware of claim 2 where the computer includes a TI TMS320 DSP.

5. Hardware of claim 1, wherein the digital signal processing component operates continuously on data from sampling component.

6. Hardware of claim 5, wherein the digital signal processing component utilizes direct memory access.

7. Hardware of claim 5, where the digital signal processing component is an FPGA.

8. Hardware of claim 1, where the digital signal processing component is an FPGA with a sample buffer.

9. Hardware wherein an a GPS C/A code and carrier tracking receiver whose software can be reprogrammed is coupled to an L1 and L2 band sampling component and a digital signal processing component, wherein a reference oscillator of said receiver and each component are common and carrier phase coherent.

10. Hardware of claim 9 wherein said GPS C/A code and carrier tracking receiver is a Canadian Marconi Electronics Superstar with an external clock input.

11. Hardware of claim 9, wherein the digital signal processing component includes a sample RAM and a computer.

12. Hardware of claim 11 where the computer includes an Intel 486 microprocessor.

13. Hardware of claim 11 where the computer includes a TI TMS320 DSP.

14. Hardware of claim 9, wherein the digital signal processing component operates continuously on data from sampling component.

15. Hardware of claim 14, wherein the digital signal processing component utilizes direct memory access.

16. Hardware of claim 14, where the digital signal processing component is an FPGA.

17. Hardware of claim 9, where the digital signal processing component is an FPGA with a sample buffer.

18. Hardware of claim 17, where the digital signal processing component utilizes discontinuous, batch segments.

* * * * *